United States Patent
Ishigami et al.

(10) Patent No.: US 6,229,241 B1
(45) Date of Patent: May 8, 2001

(54) STRUCTURE AND MANUFACTURING METHOD FOR MOTOR AND STATOR

(75) Inventors: Takashi Ishigami, Fujisawa; Yukinori Taneda, Yokohama; Toshihiko Sakai, Yokohama; Hiromichi Hiramatsu, Yokohama; Noriaki Yamamoto, Yokohama; Yuji Enomoto, Yokohama; Motoya Ito, Hitachinaka; Fumio Tajima, Ibaraki-ken; Suetaro Shibukawa, Hitachinaka; Masaharu Senoh, Narashino; Osamu Koizumi, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/047,738

(22) Filed: Mar. 25, 1998

(30) Foreign Application Priority Data

Mar. 26, 1997 (JP) .................................................. 9-073069
Mar. 27, 1997 (JP) .................................................. 9-075861

(51) Int. Cl.$^7$ ...................................................... H02K 3/04
(52) U.S. Cl. .......................... 310/208; 310/201; 310/202; 310/203; 310/206; 310/216; 310/198; 310/179; 29/596
(58) Field of Search .................................. 310/208, 202, 310/203, 206, 201, 207, 258, 259, 260, 179, 198; 29/596

(56) References Cited

U.S. PATENT DOCUMENTS

| | | | | |
|---|---|---|---|---|
| 589,845 | * | 9/1897 | Mallett | 310/208 |
| 596,136 | * | 12/1897 | Batchelder | 310/208 |
| 1,843,589 | * | 2/1932 | Apple | 310/201 |
| 2,138,292 | * | 11/1938 | Casale | 310/208 |

* cited by examiner

Primary Examiner—Nestor Ramirez
Assistant Examiner—Thanh Lam
(74) Attorney, Agent, or Firm—Mattingly, Stanger & Malur

(57) ABSTRACT

A motor having a lap winding structure and a manufacturing method therefor, wherein inserts of two different coils are installed side by side in one slot of a stator in a circumferential direction of the stator. All the coils are inserted in slots in succession. Further, a stator having semi-closed type slots formed by protuberances oriented in different directions, is used to control a reduction in the magnetic flux at the inlet of a slot and also to prevent coils from coming off. In a motor having coils of a plurality of phases for generating a rotating magnetic field at a stator, the contact portion of the coil of the desired phase among the coils of the plurality of phases and a portion rising from a slot toward the axis of a core are aligned and disposed to have a shape which prevents them from interferring with end portions of the coils of other phases.

7 Claims, 19 Drawing Sheets

A–A

B–B

C–C

STRUCTURE AND MANUFACTURING METHOD FOR MOTOR AND STATOR

BACKGROUND OF THE INVENTION

1. Field of the Invention

The present invention relates to a structure and a manufacturing method of a rotary type motor in which coils are incorporated in the slots of a stator.

Further, the present invention relates to a motor which has coils of a plurality of phases for generating a rotating magnetic field at a stator and a manufacturing method for the stator and, more particularly, to a highly efficient compact lightweight motor ideally suited for an electric vehicle and a manufacturing method for a stator thereof.

2. Description of the Related Art

As shown in FIG. 2, a stator 2a of a rotary type motor such as a DC motor has a structure in which a plurality of coils 2c composed of wound copper wire or the like installed on a multilayer iron core 2b constructed by iron sheets. FIG. 3 shows the top view of a multilayer iron core 3a before the coils are installed. A typical multilayer iron core is made as follows: a silicon steel plate having a thickness of 0.3 mm to 0.5 mm is cut by electric discharge machining, pressing, etc., and shaped into an annular component provided with slots, namely, the grooves in which the coils are inserted, formed In the inner periphery thereof. Multiple of the annular components are stacked, and the inner diameters and slots thereof are aligned, then bonded by welding or caulking. Slots 3b through 3m are provided at equal intervals in the inner periphery of the multilayer iron core 3a; coils 4a as shown in FIG. 4 composed of wound and formed copper wires are installed in these slots. There is an alternative available method in which wire is directly wound in the slots to form the coils. The coil 4a shown in FIG. 4 has inserts 4b and 4c which are fitted in the slots of a stator, and coil ends 4d and 4e which are disposed at the top and bottom of the stator. Such a coil comes roughly in two types. In one type, a thick wire having a diameter of about 1.2 mm to about 3 mm is wound and the inserts are pressed to have rectangular shapes and aligned. In the other type, a thin wire having a diameter of 1.2 mm or less is wound, and the wires of the inserts are bundled and shaped. In either type, the coils are shaped before they are self-fused or the wires are bonded to each other with an adhesive agent. These coils are incorporated in the stator to make up a motor stator. Incidentally, the term "self-fusing" is a method in which a nylon or epoxy type resin is coated on the surfaces of wires in advance and it is melted by heating with current or hot air or by heating in a furnace so as to bond the wires to each other.

FIG. 5 shows how the coil 4a is inserted in the stator 5a. The two inserts 4b and 4c are fitted in two slots 5b and 5c in the inner periphery of the stator 5a. In the same manner, the coils are inserted in the other slots.

Lap winding is one of the structures for installation on the stator. FIG. 6 illustrates an example of a motor stator 6a which employs the lap winding structure for installing the coils. One coil is mounted on the stator in such a manner that it is spanned over two slots, and the two inserts of each coil are disposed on the inner side and outer side, respectively, in the slots in the radial direction of the stator. For instance, in the case of a coil 6b, inserts 6n and 6o are fitted in slots 6b' and 6e' over two slots 6c' and 6d'. One insert 6n is disposed on the inner side in the radial direction of the stator in the slot 6b' and the other insert 6o is disposed on the outer side in the radial direction of the stator in the slot 6e'. Next, inserts 6p and 6q of an adjoining coil 6c are fitted in slots 6c' and 6f' over two slots 6d' and 6e'. One insert 6p is disposed on the inner side in the radial direction of the stator in the slot 6c' and the other insert 6q is disposed on the outer side in the radial direction of the stator in the slot 6f'. In the same manner, the adjoining coils 6d through 6m are installed in slots 6d' through 6m' by lapping them clockwise to complete the winding structure which is evenly shaped in the circumferential direction of the stator 6a. This lap winding structure, however, has a major disadvantage: since the inserts of the individual coils 6b through 6m are disposed on the inner and outer sides of the slots, it is necessary to pull out the inserts of the three coils 6b through 6d which have been disposed on the inner sides of the slots and to install the inserts of the other three coils 6k through 6m on the outer sides of the slots. This process for uninstalling the coils requires much time and involves high possibility of damaging the coating of wires, thus posing a big bottleneck in manufacturing motors.

To solve the problem with the coil uninstalling process, a stator 7a having a modified lap winding structure shown in FIG. 7 has been devised. This structure employs three types of coils having different shapes, namely, coils 7b through 7d, coils 7k through 7m, and coils 7e through 7j. First, both inserts of the coils 7b through 7d are installed so that they are positioned on the outer sides of slots 7b' through 7g', then the coils 7e through 7j are inserted in slots 7e' through 7m' in order clockwise. Thus, one insert of each of the coils 7e through 7j is disposed on the inner side in the radial direction of the stator, while the other insert thereof is disposed on the outer side in the radial direction of the stator. The coils 7b through 7d will have been installed on the outer sides of slots 7k' through 7d' before inserting last three coils 7k through 7m; hence, both inserts of each of the coils 7k through 7m are respectively installed on the inner sides of the slots 7k' through 7d'. As described above, this structure allows the coils to be inserted in the stator in succession without the need for the coil uninstalling process. The structure requires, however, that the three different types of coils, namely, 7b through 7d, 7e through 7j, and 7k through 7m having different shapes, are manufactured separately, and the inserting sequence based on the type of coils is observed. Further, the stator 7a develops unevenness in the circumferential direction thereof, leading to uneven revolution of the motor incorporating the stator due to uneven magnetic field.

The foregoing lap winding and modified lap winding use the structure wherein two coil inserts 8a and 8b are installed in one slot 8c and the coils are arranged in the radial direction of the stator as shown in FIG. 8. In either winding structure, an open-slot stator, which permits easier installation of coils, is normally used. Immediately after a coil has been inserted in a slot or after the coils have been inserted in all slots, paper or a magnetized wedge or wedges 8d are placed in an inlet or inlets 8e of a slot or slots to secure the coil or coils.

(1) FIG. 9 illustrates a stator 9a having a structure wherein coils 9b through 9j are inserted clockwise in slots 9b' through 9m' and the last three coils are left uninserted. In the case of the lap winding, the two inserts of each coil are disposed side by side in a slot in the radial direction of the stator as illustrated by 8a and 8b of FIG. 8. For this reason, by the time the last three coils, not shown, are inserted in slots 9k', 9l', 9m', 9b', 9c', and 9d', the inserts 9n, 9o, and 9p on one side of the three coils 9b, 9c and 9d which have been installed first will have already been disposed on the inner sides of the slots 9b', 9c', and 9d', thus preventing the insertion of the coils on the outer sides of the slots. Hence, it is necessary to conduct the so-called coil uninstalling work for temporarily removing the coil inserts 9n, 9o, and 9p disposed on the inner sides of the slots 9b', 9c', and 9d' from the slots. After uninstalling the coil inserts, the inserts of the coils to be installed last (not shown) are installed on the outer sides of the slots 9b', 9c', and 9d', the other inserts being disposed on the inner sides of the slots 9k', 9l', and 9m'. Then, the inserts 9n, 9o, and 9p which have been uninstalled are reinstalled on the inner sides of the slots 9b', 9c', and 9d'. The coil inserts are about 97 to about 99% as wide as the slots, so that uninstalling the coils which have been inserted are very likely to cause the side surfaces or edges of the slots to scratch the coils. In addition, since the inserts 9n, 9o, and 9p are positioned in an interior 9q of the stator after uninstalling them from the slots, they take up the working space for inserting the last three coils. This makes it difficult and time-consuming to insert the last three coils. There are cases where the inserts 9n, 9o, and 9p of the coils 9b, 9c, and 9d are temporarily left in the interior 9q of the stator without inserting them in the slots 9b', 9c', and 9d' in order to prevent damage to the coating caused by installing and uninstalling the coils; however, the coils temporarily left uninserted hinder the insertion of all other coils, thus requiring a lot of time for completing the installation of the coils. In FIG. 9, the lap winding structure wherein a coil is inserted over two slots has been employed to explain the problem involved in the structure. The same applies to a lap structure wherein one coil is spanned over a different number of slots. As the number of slots over which a coil is spanned, increases the area of the inner periphery required for uninstalling coils increases, resulting in more difficult insertion or even making insertion impossible in some cases.

(2) As means for solving the problem of uninstalling the coils described above, the modified lap winding shown in FIG. 7 has been devised. In this structure, both inserts 7b''' and 7b''', 7c'' and 7c''', and 7d'' and 7d''' of three coils 7b, 7c, and 7d to be installed first are disposed on the outer sides of slots 7b' through 7g', while both inserts 7k''' and 7k''', 7l'' and 7l''', and 7m'' and 7m''' of three coils 7k, 7l, and 7m to be installed last are disposed on the inner sides of slots 7k' through 7d'. As previously mentioned, both inserts of each of the coils 7b, 7c, and 7d are inserted in order at the outer sides of slots 7b' through 7g', then coils 7e through 7j are inserted clockwise in the slots 7g' through 7m' in the lap winding fashion, beginning with a slot 7e'. Lastly, both inserts of each of the coils 7k, 7l, and 7m are inserted at the inner sides of the slots 7k' through 7d', thus allowing all coils to be inserted without the need for uninstalling coils. In this structure, however, the way the coils are inserted differs depending on the slots, and it is therefore required to make three different types of coils, namely, the coils 7b through 7d to be inserted first, the coils 7k through 7m to be installed last, and the coils 7e through 7j to be installed between the former two groups of coils. This also involves a disadvantage in that the coils must be installed while checking the shapes of each coil and the inserting sequence. The structure, therefore, is advantageous in that it reduces the chance of damage to the coils caused by installing and uninstalling the coils to and from the slots, but it is not necessarily superior to the standard lap winding from the standpoint of the total time and cost for manufacturing a stator. In addition, since the shapes of the coils and the way they are inserted are different, the finished stator is uneven in the circumferential direction. The result is an uneven magnetic field with uneven revolution of the motor incorporating the stator.

(3) In both the lap winding structure and modified lap winding structure, the coils are usually installed on an open-slot stator. In the case of an open-slot, there is less magnetic flux at the inlet of the slot and the efficiency of the motor is lower accordingly. Further, during the installation, the coils which have already been inserted often come out of the slots, adding to the difficulty in the installation work.

In a conventional manufacturing method for a motor of a few tens of watts or less, enameled wire is directly wound on a stator, then a coil end is shaped for finish to make the coil end compact. A motor having a larger output is usually manufactured as follows: former winding is finished in advance and both sides of an insert are forcibly fitted by an inserter at the same time in a slot radially toward the outside diameter thereof. In this case, semi-closed slots are normally used. The former-wound wires are disturbed in alignment at the time of insertion and they are inserted with the wires crossing. Even for coils of two phases or more, formers designed with no difference for different coil shapes are used to perform winding. When all coils of one phase have been inserted in a core, the coils are set down about the portions near the edge surface of the core toward the outside diameter of the core to shape the coil ends for each phase so as to allow the coils of the next phase to be inserted. Then, after all coils have been inserted, the coil ends of the coils inserted first, which coil ends have been pushed toward the outside diameter of the stator core, and the coil ends of the coils inserted last, which coil ends have remained at the inside diameter side, are compressed and shaped in the radial and axial directions, thereby making the coil ends compact.

The conventional inserting method and coil end finishing method, however, inevitably place restrictions in achieving further compactness of coil ends. This is because the insertion based on direct winding or the use of an inserter has a restricted occupancy. According to the inserting method, occupancy of 70% is usually the limit because of the disturbance attributable to the crossing of wires that occurs at the time of insertion. Moreover, in the coil end shaping process, the extra length of the coil ends required for inserting a coil or for allowing the next coil to be inserted is compressed to a certain extent, and the length of the coil ends contributing greatly to loss remains unchanged.

SUMMARY OF THE INVENTION

Accordingly, it is an object of a first aspect of the present invention to achieve more efficient installation of coils and to provide a motor with higher efficiency and higher quality.

(1) To solve the problems with the conventional lap winding and modified lap winding, a new lap winding structure is employed. In the new lap winding structure, coils which share the same shape so that they are approximately axisymmetric to the centerline of a coil end are used, and the inserts of two different coils are installed side by side in one slot of a stator and the inserts are arranged in the circumferential direction of the stator. The use of this structure makes it possible to prevent the inserts of all the coils from interfering with each other when installing them in the slots from the start to the end of the installation of the coils, thus obviating the need for uninstalling any coils. This permits dramatically reduced time required for installing the coils and also enables wires to be protected against damage caused by installing or uninstalling the coils. Furthermore, since all the coils share the same shape, there is no need to sort the coils at the time of installation.

(2) To prevent the reduction in magnetic flux and to prevent coils from coming off slots when open slots are used, two types of semi-closed slots having protuberances oriented in different directions are disposed at two locations of the inner periphery of the stator, and the aforesaid new lap winding structure is used to install the coils. This makes it possible to control the reduction in magnetic fluxes at the inlets of the slots so as to prevent the efficiency of the motor from deteriorating and to securely install the coils so that they do not come off the slots during installation.

Further, an object of a second aspect of the present invention is to provide a motor which realizes reduced size and weight by improving the occupancy of coils and by reducing the loss of coil ends, and to provide a manufacturing method for a stator of the motor in order to solve the problems described above.

It is yet another object of the present invention to provide a motor which is composed of three-phase concentric winding and which achieves reduced size and weight by improving the occupancy of coils and by reducing the loss of coil ends, and to provide a manufacturing method for a stator of the motor.

To these ends, according to the second aspect of the present invention, there is provided a motor which has coils of a plurality of phases generating a rotating magnetic field at the stator, wherein the contact portion and a portion, which rises from a slot toward the axis of a core, of a coil of the desired phase among the coils of the plurality of phases are shaped and aligned so that they do not interfere with the ends of the coils of other phases.

In a preferred form, in the motor which has coils of a plurality of phases generating a rotating magnetic field at the stator, the inner side of the contact portion of a coil of the desired phase, the contact portion being located at the outermost position in the radial direction, among the coils of the plurality of phases is positioned beyond the prolonged line of the slots in which the coils of other phases are inserted.

In another preferred form, in the motor which has a stator composed of three-phase concentric winding, the coil slot occupancy (the sectional area of a coil with respect to the sectional area of the slot, excluding an insulator) is 80% or more, the ends of the coils of the respective phases (the parts of the coils which extend outward in the axial direction from the core after insertion) have different shapes, and the contact portions of the coils of the respective phases are arranged in alignment.

In a further preferred form, in the motor which has coils of a plurality of phases generating a rotating magnetic field at the stator, the slots and coils are shaped so that, if the outside diameter of the section of a conductor (including an insulating layer) of one turn is denoted as "d", the total thickness of slot insulating paper, which ensures core pressure resistance in a slot, in the radial direction in a slot is denoted as "t", and the number of turns is denoted as "T", then the width of a slot opening of the stator is (d+t) or less and the depth of the slot is smaller than (d×T).

According to still another aspect of the present invention, there is provided a manufacturing method for a stator, the manufacturing method including:

a winding step for forming coils by aligned winding;

a coil forming step for compression-forming paired coil sides, which are inserted in paired slots, in a coil formed in the winding step, into rectangular shapes to improve the slot occupancy, for combining them into one piece by bonding or the like with attention paid not to disturb the wires, and for deforming a contact portion approximately to the angle at which it is spanned over the paired slots; and an installing step for positioning the coil, which has been formed in the coil forming step, on the inner periphery of the core and for installing the coil by inserting the paired coil sides of the coil in corresponding slots in sequence.

According to a further aspect of the present invention, there is provided a manufacturing method for a stator, the manufacturing method including:

a winding step for forming a U coil by aligned winding, forming a V coil by aligned winding, and forming a W coil by aligned winding;

a coil forming step for compression-forming paired coil sides, which are inserted in paired slots, in each of the U coil, the V coil, and the W coil formed in the winding step, into rectangular shapes to improve the slot occupancy, for combining them into one piece by bonding or the like with attention paid not to disturb the wires, and for deforming the contact portions thereof approximately to the angles at which they are spanned over the paired slots; and an installing step for positioning each of the U coil, the V coil, and the W coil, which have been formed in the coil forming step, on the inner periphery of the core and for installing the coils by inserting the paired coil sides of the coil in corresponding slots in sequence.

Thus, according to the foregoing configurations, the slot occupancy of the stator coils is improved, the coil ends are arranged in alignment with a higher density and the winding resistance is reduced; hence, the efficiency of the motor can be improved and the size and weight of the motor can be reduced.

Moreover, according to the foregoing configurations, the shapes of the coils can be finished before installing the coils on the stator core; hence, stable shapes of the coils are ensured, so that the need for the shaping and finishing process for the coil ends can be eliminated, resulting in higher work efficiency. Further, the chances of damage to the insulation coating of installed coils can be minimized, enabling stable quality.

BRIEF DESCRIPTION OF THE DRAWINGS

FIG. 15A is a sectional view taken at the line A—A shown in FIG. 14, FIG. 15B is a sectional view taken at the line B—B shown in FIG. 14, and FIG. 15C is a sectional view taken at the line C—C shown in FIG. 14;

DETAILED DESCRIPTION OF THE PREFERRED EMBODIMENTS

Figure 10:
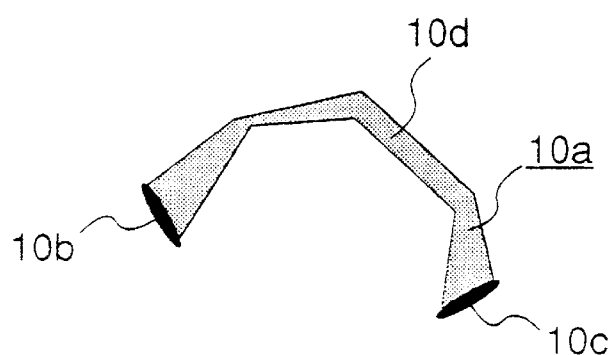
FIG. 10 shows a coil before the lap winding structure in accordance with the present invention is implemented.

The embodiments of the lap winding structures in accordance with the present invention will be described. FIG. 10 shows the shape of the coil end of a coil $10a$ which implements a new lap winding structure; the drawing is a view observed from a direction parallel to inserts $10b$ and $10c$ to be installed on a stator. Reference numeral $10d$ denotes the coil end; the coil end $10d$ is shaped such that it is approximately asymmetric to the centerline thereof and has a clearance at the central portion thereof so as not to overlap the slots over which the coil crosses (the slots correspond to the inserts of another coil). The inserts $10b$ and $10c$ to be installed in slots are oriented to form lines in the radial direction of the stator.

Figure 1:
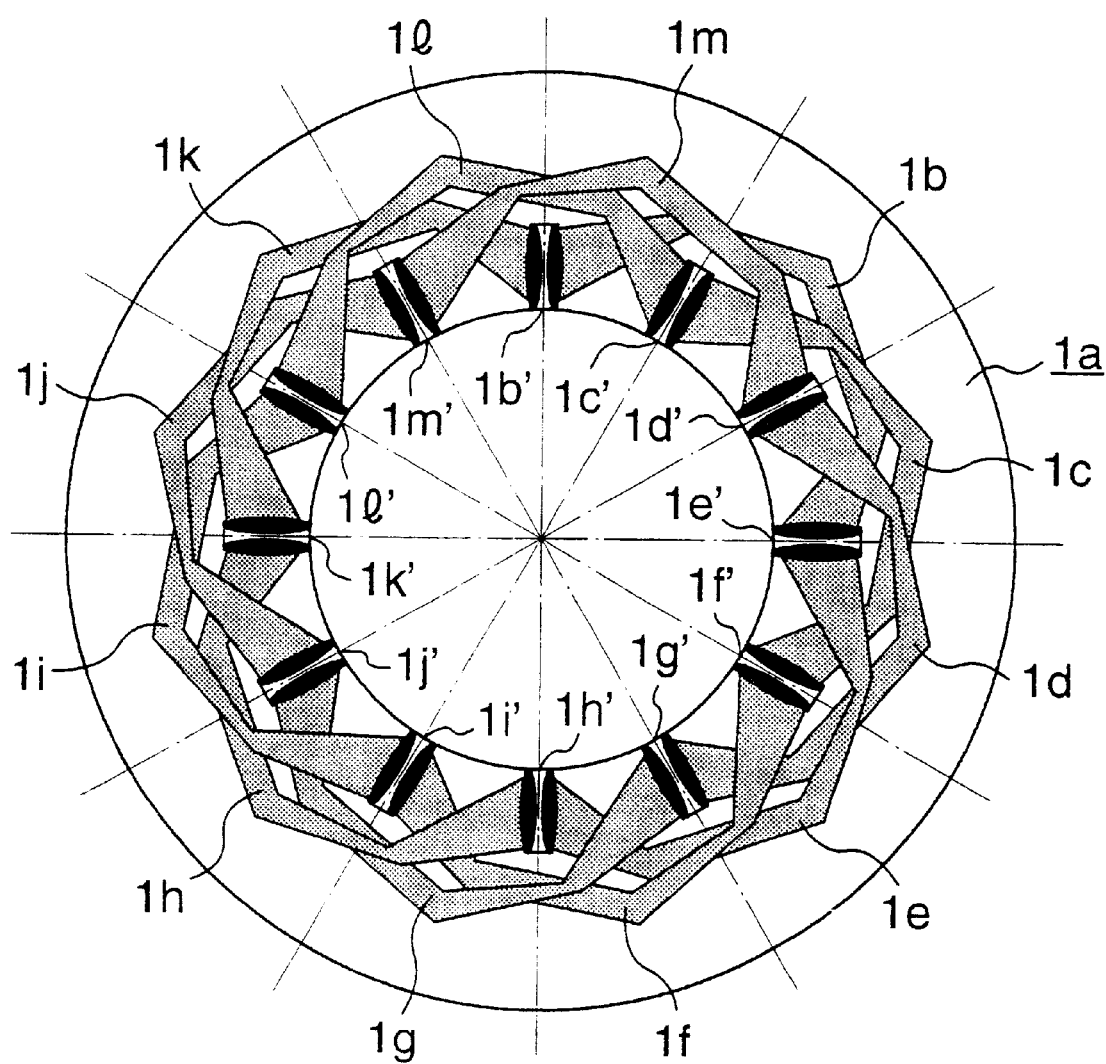
FIG. 1 shows a motor stator having a lap winding structure in accordance with the present invention.
Figure 2:
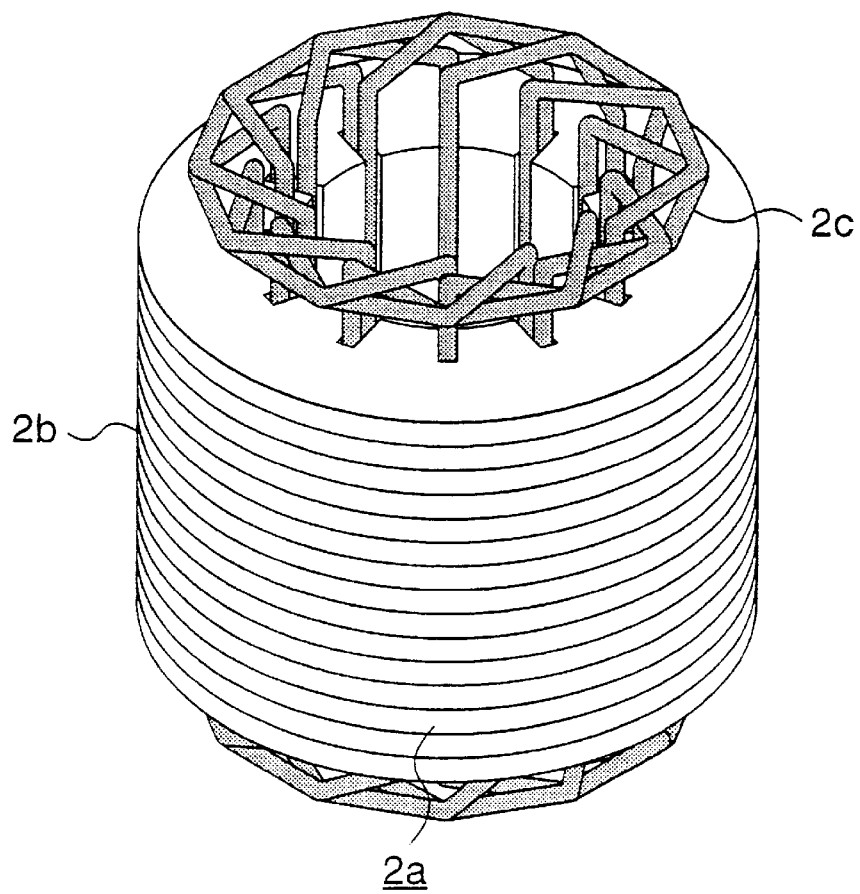
FIG. 2 shows a typical motor stator of a rotary type motor.
Figure 3:
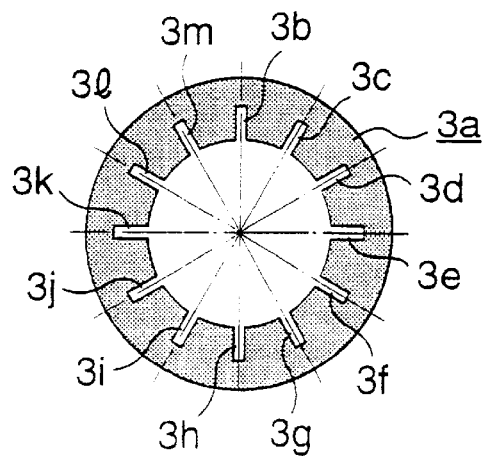
FIG. 3 shows a multilayer iron core of the motor stator of FIG. 2.
Figure 4:
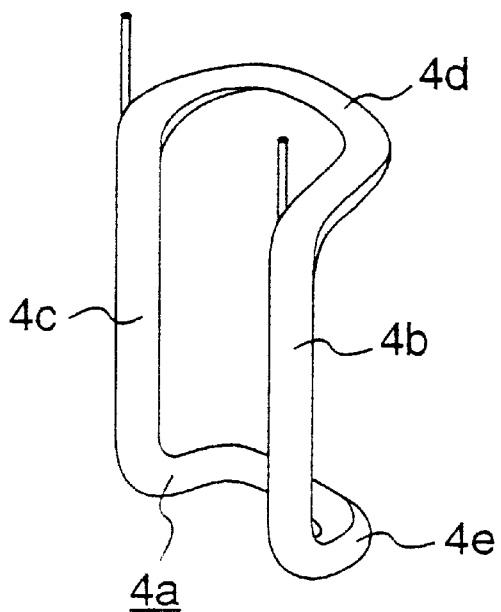
FIG. 4 shows a coil before it is installed on the stator.
Figure 5:
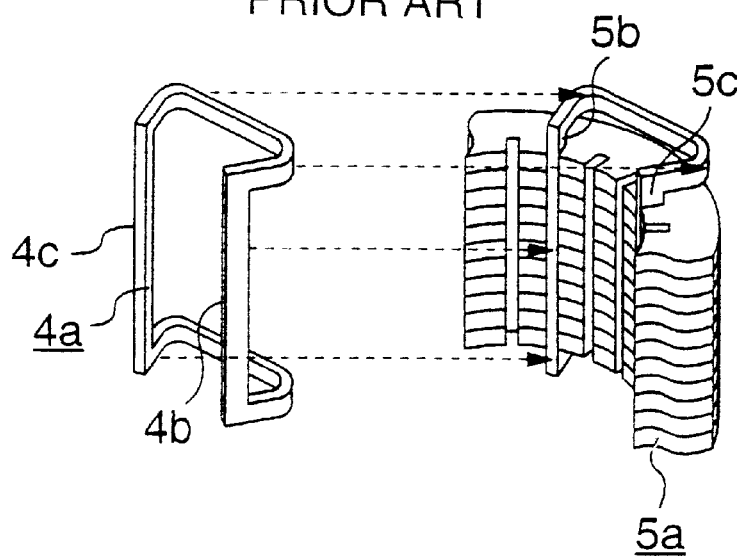
FIG. 5 shows how the coil is installed in a slot of the stator.
Figure 6:
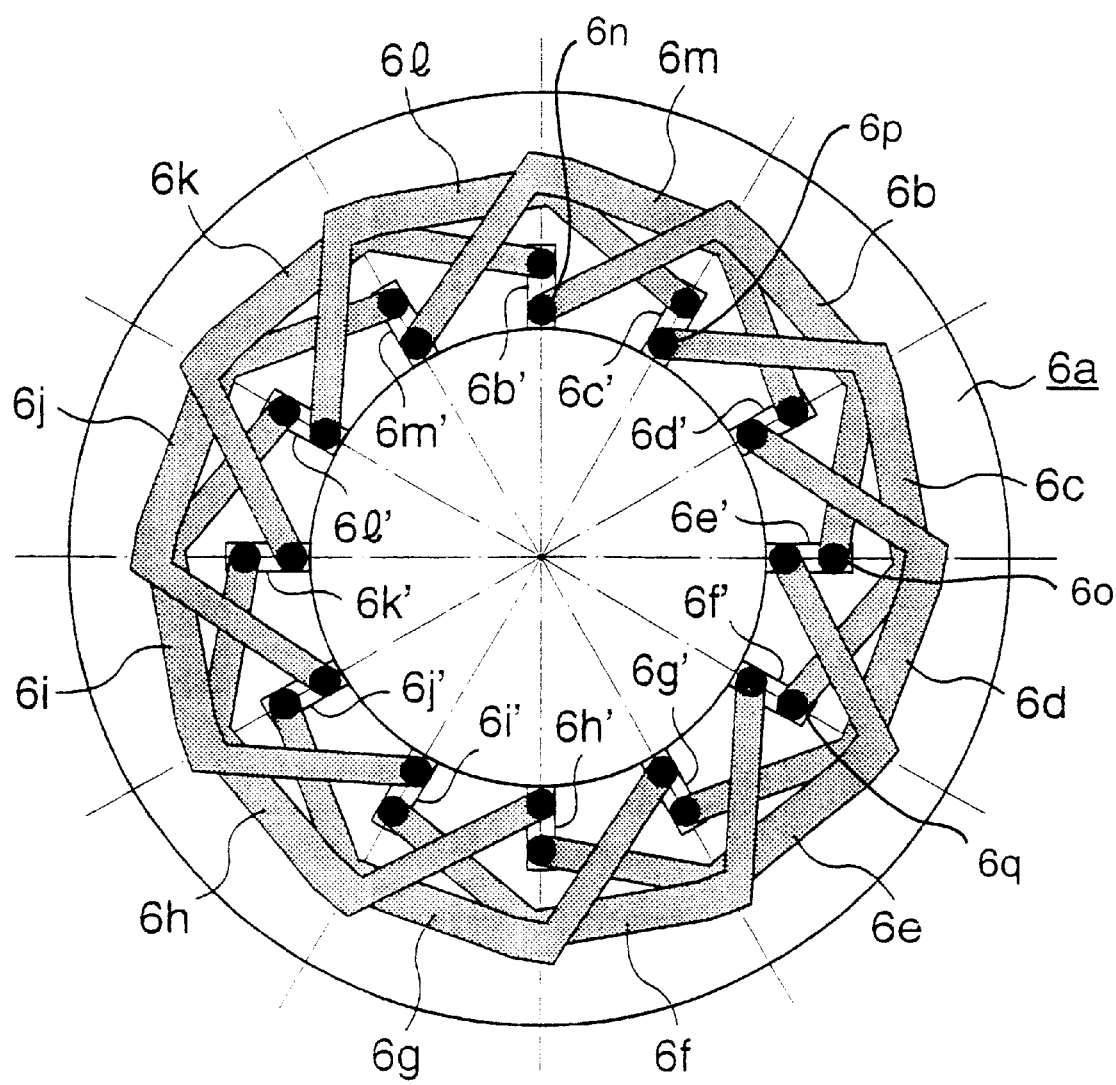
FIG. 6 shows a motor stator having a conventional lap winding structure.
Figure 7:
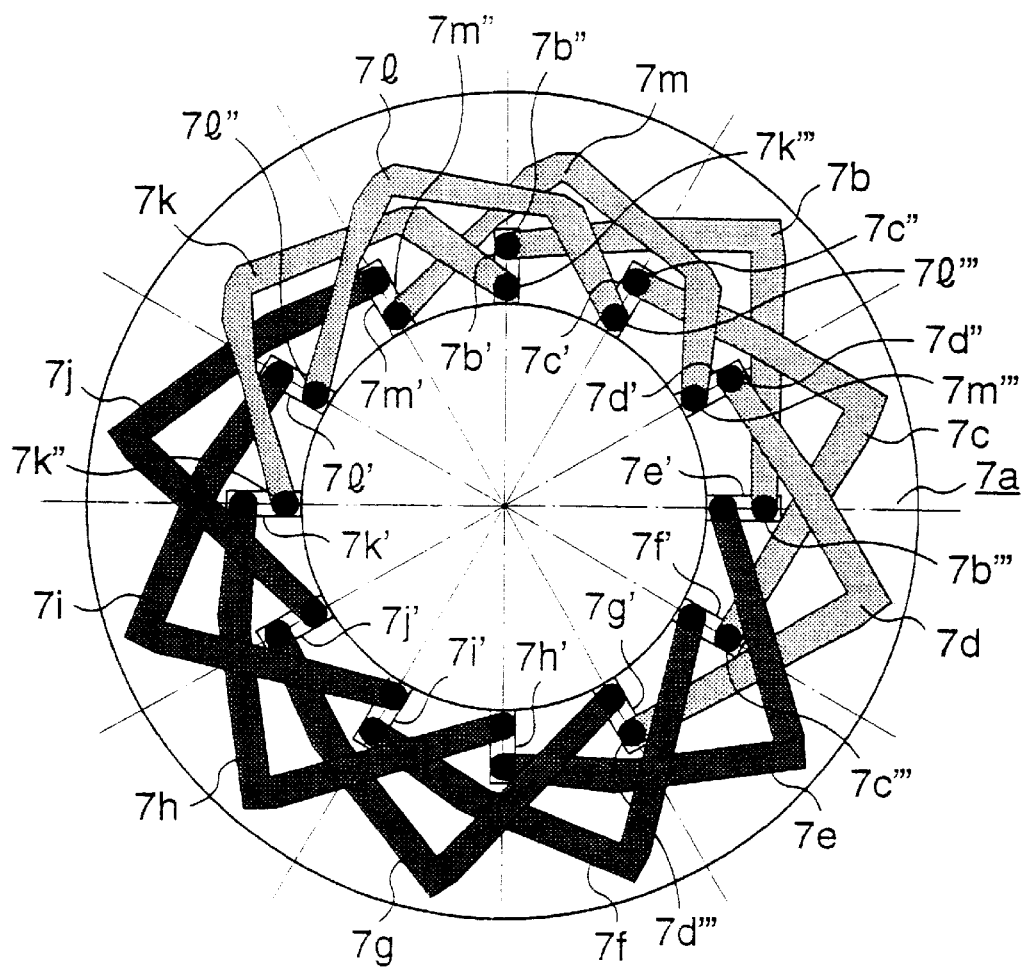
FIG. 7 shows a motor stator having a modified lap winding structure.
Figure 8:
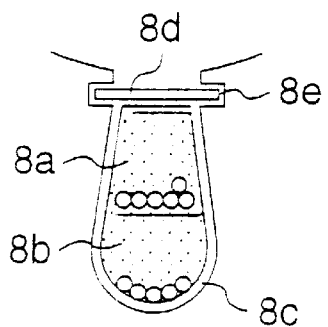
FIG. 8 is a sectional view of a slot of a conventional lap winding structure.
Figure 9:
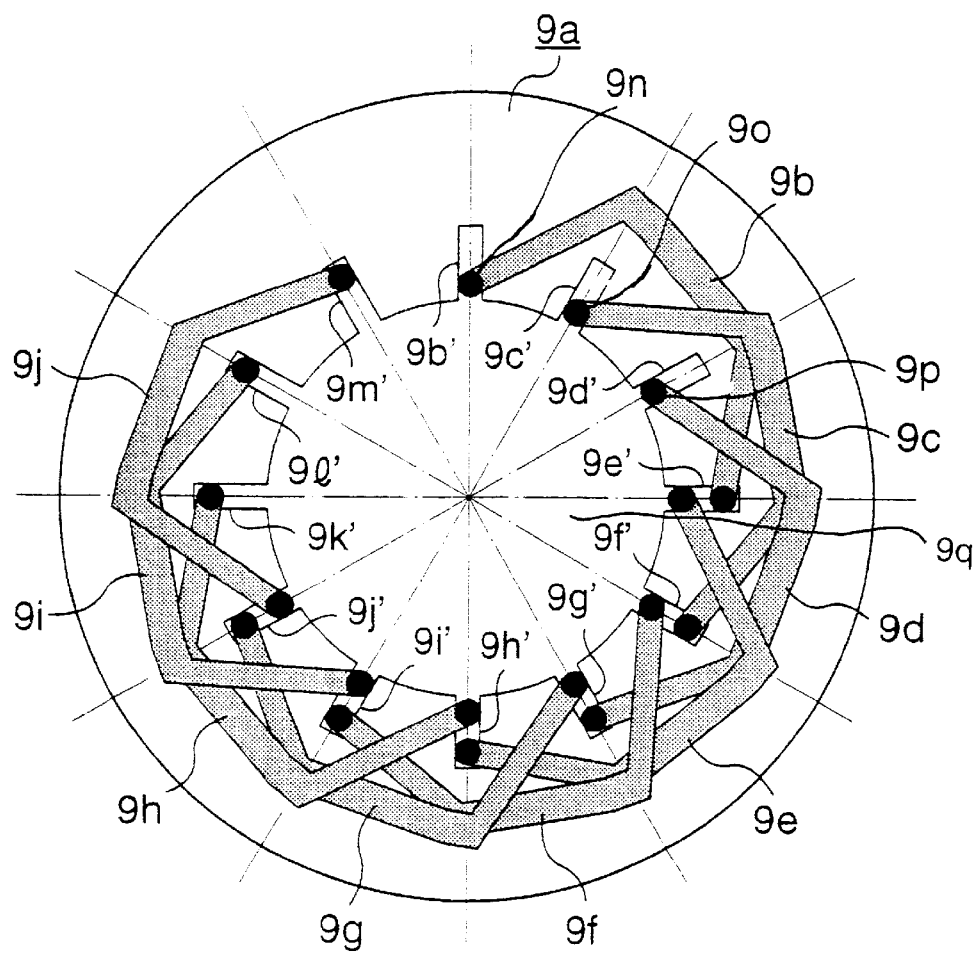
FIG. 9 shows a motor stator before the last three coils are installed after the conventional lap winding has been finished.
Figure 11:
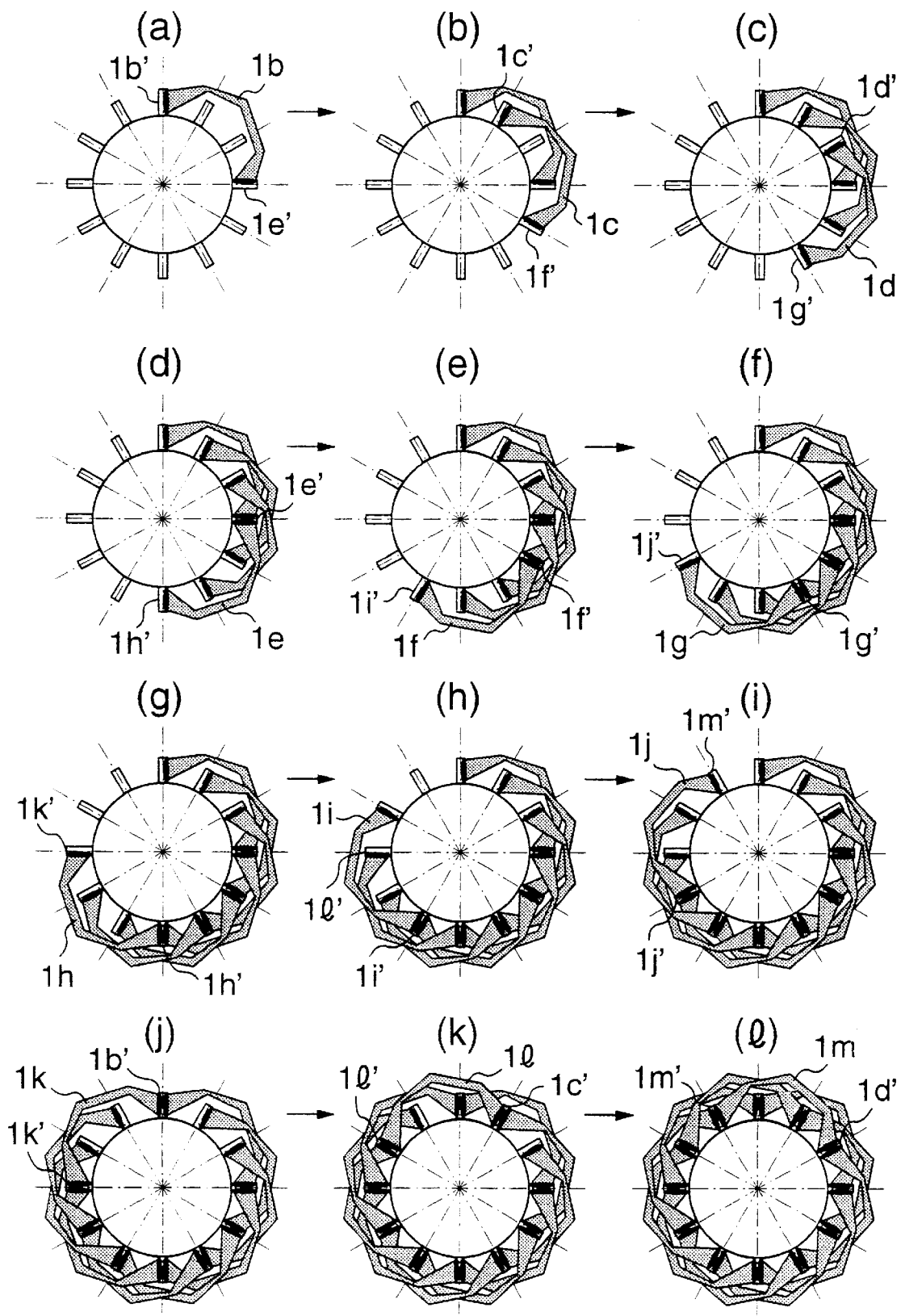
FIGS. 11(a)–(l) show how coils are installed in the slots of a stator in the lap winding structure in accordance with the present invention.
Figure 12:
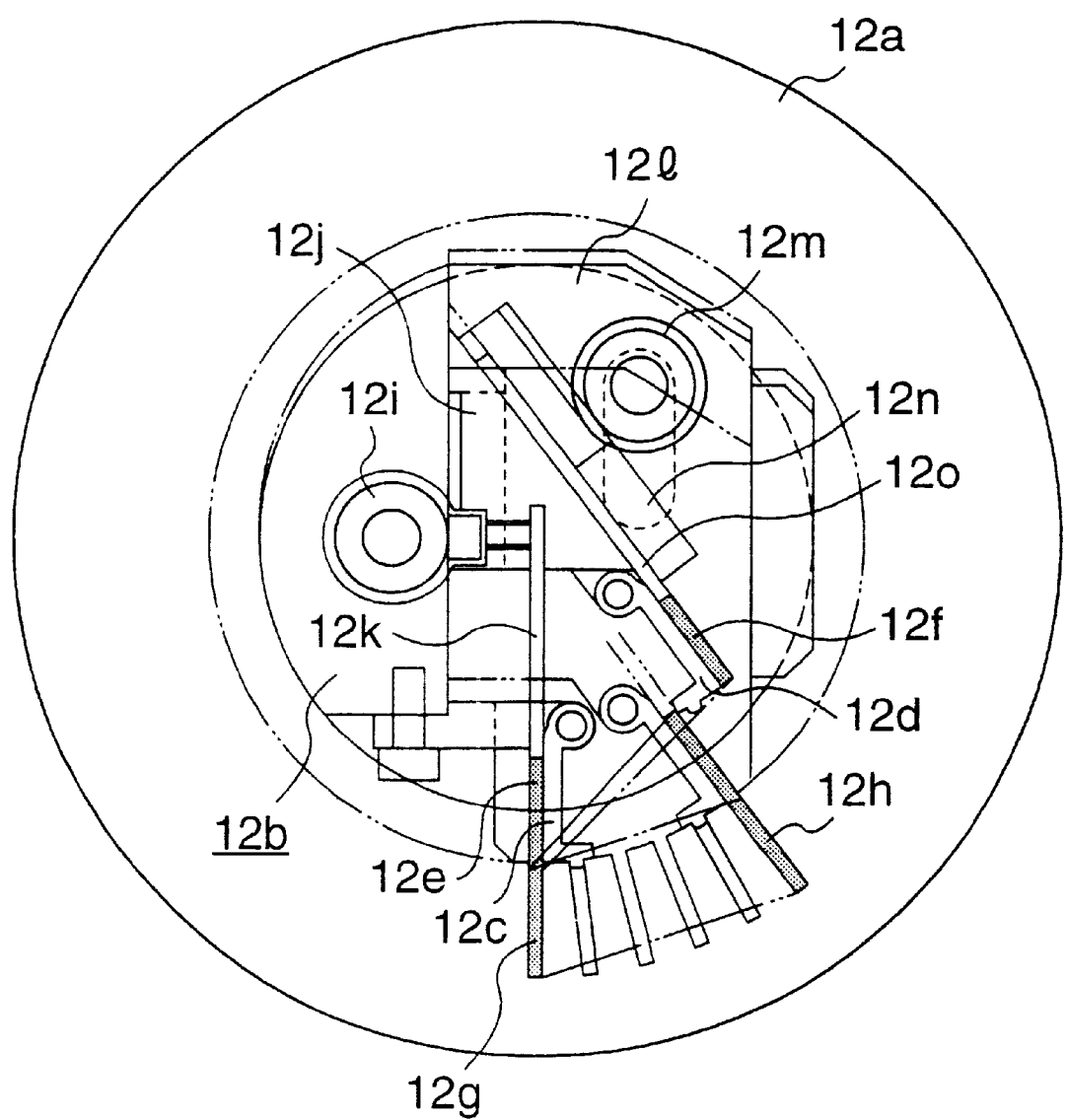
FIG. 12 shows a mechanism for performing automatic installation of coils in the lap winding structure in accordance with the present invention.

FIG. 1 shows a plurality of coils $1b$ through $1m$ having the foregoing shape which have been installed to a stator $1a$. The inserts of two different coils are installed in each of slots $1b'$ through $1m'$ such that they are arranged side by side in the circumferential direction of the stator. Referring now to FIG. 11($a$) through FIG. 11($l$), it will be explained how the coils $1b$ through $1m$ are installed in the slots $1b'$ through $1m'$ of the stator. First, the coil $1b$ is inserted in the slots $1b'$ and $1e'$ so that the inserts thereof divide the slots $1b'$ and $1e'$ in two in the circumferential direction and the inner sides of the coil are in contact with the side walls of the slots as illustrated In FIG. 11($a$). Then, the coil $1c$ is inserted in the slots $1c'$ and $1f'$, which are shifted one block each clockwise from the foregoing slots, so that the inserts thereof divide the slots $1c'$ and $1f'$ in two in the circumferential direction and the inner sides of the coil are in contact with the side walls of the slots as illustrated in FIG. 11($b$). Further, the coil $1d$ is inserted in the slots $1d'$ and $1g'$, which are shifted one block each clockwise from the foregoing slots, so that the inserts thereof divide the slots $1d'$ and $1g'$ in two in the circumferential direction and the inner sides of the coil are in contact with the side walls of the slots as illustrated in FIG. 11($c$). After that, in the same manner, the coils $1e$ through $1j$ are inserted in the slots $1e$ through $1m$ clockwise as illustrated in FIG. 12($d$) through FIG. 12($l$). The last three coils to be inserted are denoted by $1k$, $1l$, and $1m$. The coil $1k$ is inserted in the slots $1k'$ and $1b'$; the inserts thereof divide the slots $1k'$ and $1b'$ in two in the circumferential direction and the inner sides of the coil $1k$ are in contact with the side walls of the slots, so that they are not interfered by the inserts of the coils $1h$ and $1b$ which have already been inserted in the slots $1k'$ and $1b'$ (see FIG. 11($j$)). Next, the coil $1l$ is inserted in the slots $11'$ and $1c'$; the inserts thereof divide the slots $11'$ and $1c'$ in two in the circumferential direction and the inner sides of the coil $11$ are in contact with the side walls of the slots, so that they are not interfered by the inserts of the coils $11$ and $1c$ which have already been inserted in the slots $11'$ and $1c'$ (see FIG. 11($k$)). Then, the coil $1m$ is inserted in the slots $1m'$ and $1d'$; the inserts thereof divide the slots $1m'$ and $1d'$ in two in the circumferential direction and the inner sides of the coil $1m$ are in contact with the side walls of the slots, so that they are not interfered by the inserts of the coils $1j$ and $1d$ which have already been inserted in the slots $1m'$ and $1d'$ (see FIG. 11($l$)). Thus, according to this structure, the inserts of the respective coils $1b$ through $1m$ do not interfere with each other when they are inserted in the slots $1b'$ through $1m'$ from the beginning of the installation (FIG. 11($a$)) to the end (FIG. 11($l$)). This obviates the need for uninstalling any coils. Moreover, unlike the modified lap winding, this new lap winding structure does not require the use of a plurality of shapes and inserting modes. The coils can be installed in the slots evenly in the circumferential direction. In this embodiment, the description has been given to a case where each coil is spanned over two slots when it is installed; however, the same installing method applies when a coil is spanned over a different number of coils when it is installed.

FIG. 12 is a top view observed from above a stator; it shows the mechanism for automatically installing coils having the aforesaid lap winding structure. Reference numeral $12a$ denotes a stator, and reference numeral $12b$ denotes a cylindrical mechanism for installing coils. First, inserts $12e$ and $12f$ of a coil are fixed on the mechanism $12b$ by clamps 12c and 12d, and the mechanism 12b is Inserted in the stator 12a. When a gear 1 12i is rotated with the position of the insert 12e matched with the position of a slot 12g, a rack 1 12j causes a push bar 1 12k to push the insert 12e out to insert it in the slot 12g. At this time, a second inserting mechanism 121 made integral with the rack 1 12j moves to automatically position the other insert 12f at the front of a slot 12h. When a gear 2 12m on the second inserting mechanism 121 is rotated, a rack 2 12n causes a push bar 2 12o to push the insert 12f out to insert it in the slot 12h. Upon completion of the insertion of one coil, the mechanism 12b is removed by using a cylinder or the like, and a new coil is attached to the mechanism to repeat the insertion of the coil in slots. The need for uninstalling coils has been making it difficult to achieve automatic installation of coils. The lap winding structure in accordance with the present invention, however, makes it possible to successively insert coils in slots and it obviates the need for temporarily holding coils inside slots, thus permitting effective use of the space at the inner periphery of a stator. Hence, the use of the mechanism shown in FIG. 12 enables automatic insertion of coils in lap winding which has been impossible in the past.

Figure 13:
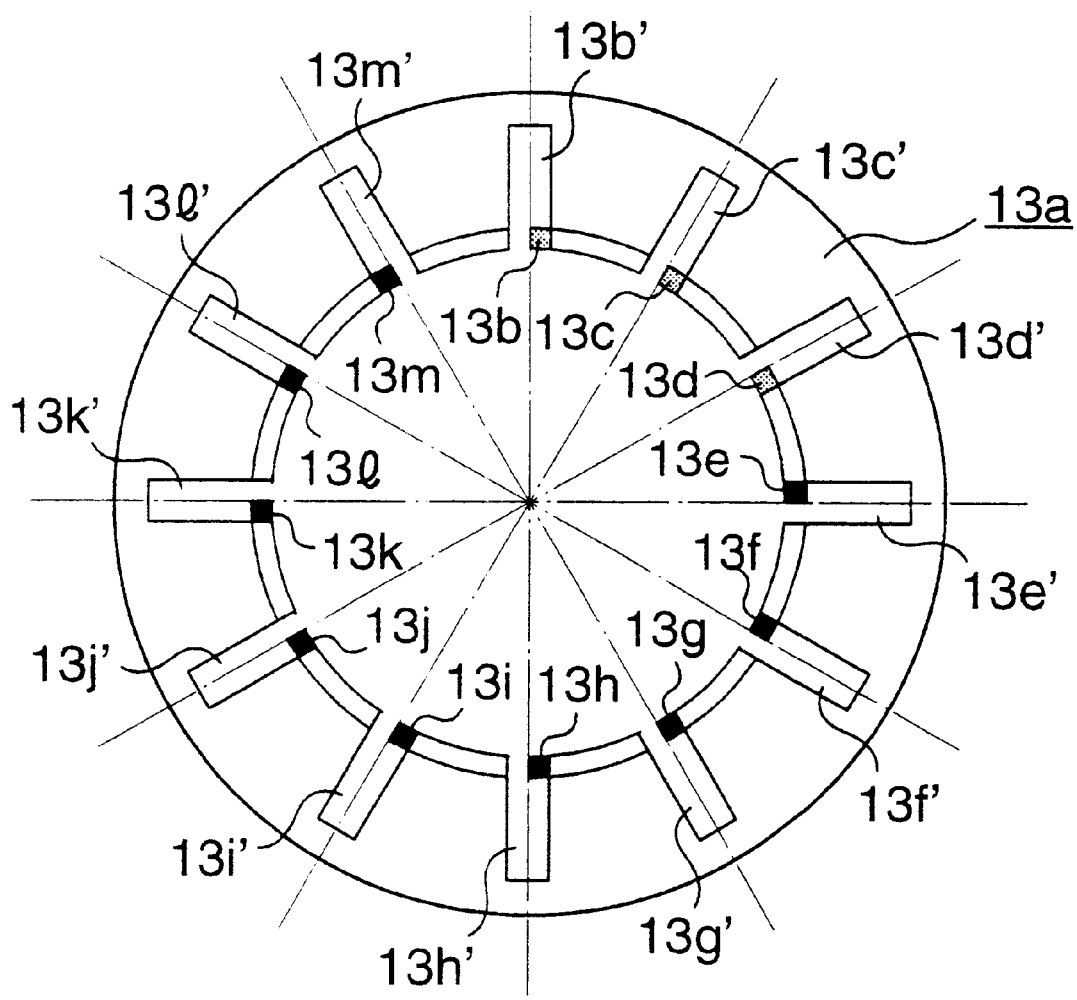
FIG. 13 shows an iron core having semi-closed slots which can be used according to the lap winding structure of the present invention.

Further, the lap winding structure described above allows coils to be installed on a stator which has semi-closed slots. FIG. 13 shows a stator 13a which has semi-closed slots. Protuberances 13b through 13m are provided at the inlets of slots 13b' through 13m'; they close the inlets of the slots 13b' through 13m' with a small gap left to barely allow one insert of the foregoing coil to be inserted in, e.g. approximately 0.05 mm between the slot width and the coil width. The protuberances 13b, 13c, and 13d of the adjoining three slots 13b', 13c', and 13d' are provided on the right side with respect to the centerlines of the slots as observed from the center of the stator. On the other hand, protuberances 13e through 13m of other slots 13e' through 13m' are provided on the left side with respect to the centerlines of the slots as observed from the center of the stator. When inserting the coils clockwise from the slot 13b', the first three coils are elastically deformed widthwise outward by the width of each of slots 13b' through 13g' in which they are to be inserted. The fourth coil from the start to the fourth coil from the last are elastically deformed by half the width of each of slots 13e' through 13m' in which they are to be inserted. The last three coils are inserted in slots 13k' through 13d' without deforming them. Thus, the respective inserted coils will be just like those shown in FIG. 11(a) through FIG. 11(l), and all coils can be installed in the slots 13b' through 13m' without interference with the protuberances 13b through 13m. In this case, the protuberances 13b through 13m close almost half the inlet spaces of the slots 13b' through 13m', so that the reduction in magnetic flux caused by open slot inlets can be minimized. This permits higher efficiency of a motor in comparison with a motor which uses a stator with open slots. In the embodiment, the description has been given to a case where each coil is spanned over two slots when installing it; however, the same coil installing method applies when each coil is spanned over more slots. In the case of a lap winding structure where each coil id spanned over an "n" number of slots, the protuberances of an (n+1) number of adjacent slots are provided on the right side in relation to the centerlines of the slots as observed from the center of the stator, and the protuberances of the remaining slots are provided on the left side.

This aspect of the present invention provides the advantages described below.

(1) The process for uninstalling coils is no longer necessary, and coils can be installed to a stator in succession. Moreover, it is no longer necessary to make different types of coils and to strictly observe an installing order. This leads to reduced time for installing coils to a stator, permitting lower cost of motors. In addition, it is possible to accomplish automated installation of coils having a lap winding structure, which has been difficult to accomplish in the past.

(2) Since the process for uninstalling coils is no longer necessary, the possibility of damage to the coating of coils attributable to uninstalling and reinstalling the coils can be reduced, resulting in a dramatically higher yield.

(3) A stator having semi-closed slots can be employed. This makes it possible to control the reduction in the magnetic flux at the inlets of slots, leading to higher efficiency of the motor. Moreover, it is possible to prevent coils from coming off slots during installation, permitting higher efficiency and quality of the installation work.

A second embodiment in accordance with the present invention will now be described in conjunction with the accompanying drawings.

A motor is constructed by a stator and a rotor. The stator is made by three-dimensionally inserting a plurality of coils in the slots of an iron core or the like.

Another embodiment of the invention will be described, in which a plurality of coils are three-dimensionally arranged and combined on an iron core or the like in stator coils composed of coils of multiple phases employed in a motor such as an induction motor or a synchronous motor.

Figure 14:
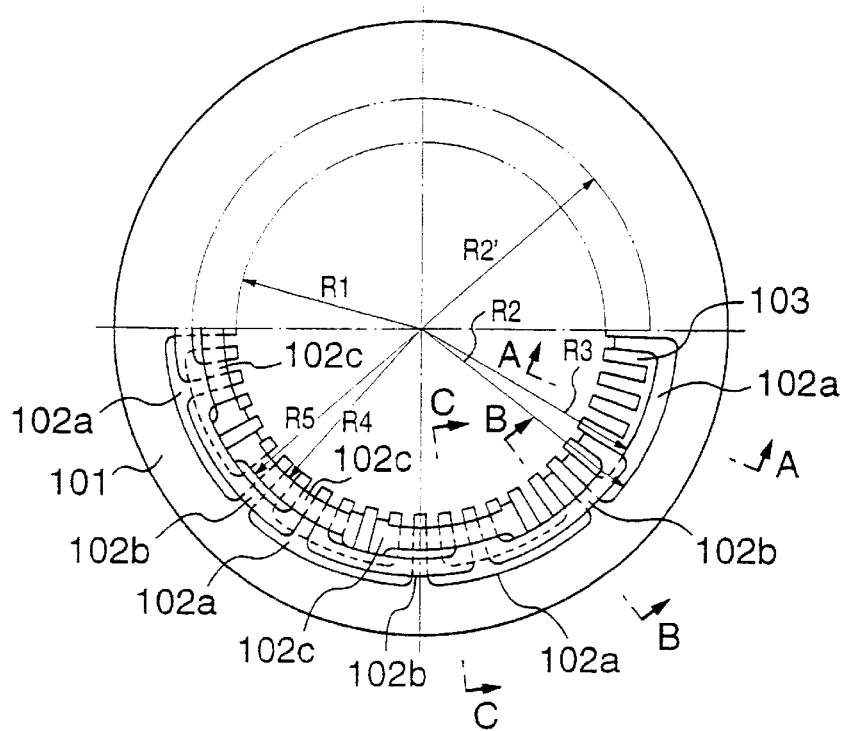
FIG. 14 is a front view showing an embodiment of the stator in which coils have been installed in a motor in accordance with the present invention.
Figure 15A:
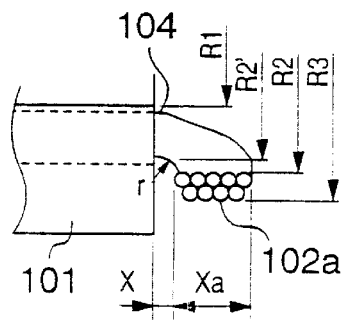
FIGS. 15A, 15B, and 15C are side sectional views of FIG. 14.
Figure 15B:
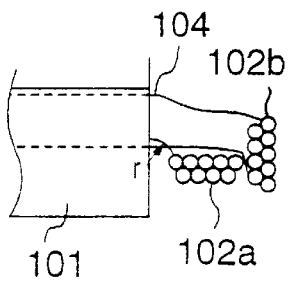
Figure 15C:
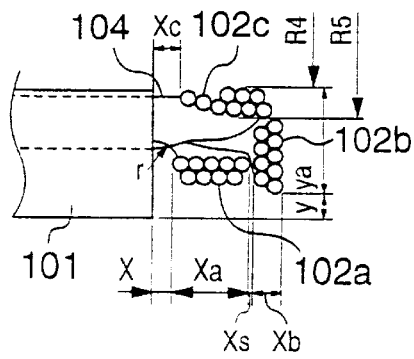
Figure 16:
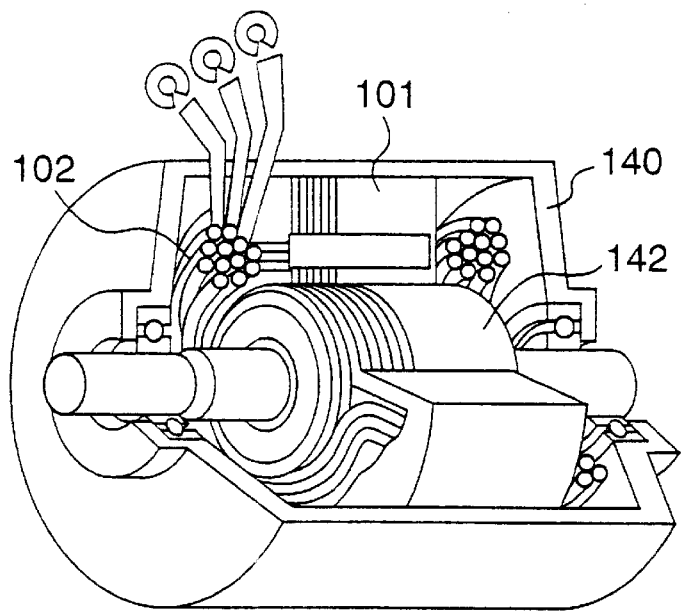
FIG. 16 is a perspective view showing an embodiment of the motor in accordance with the present invention.
Figure 17:
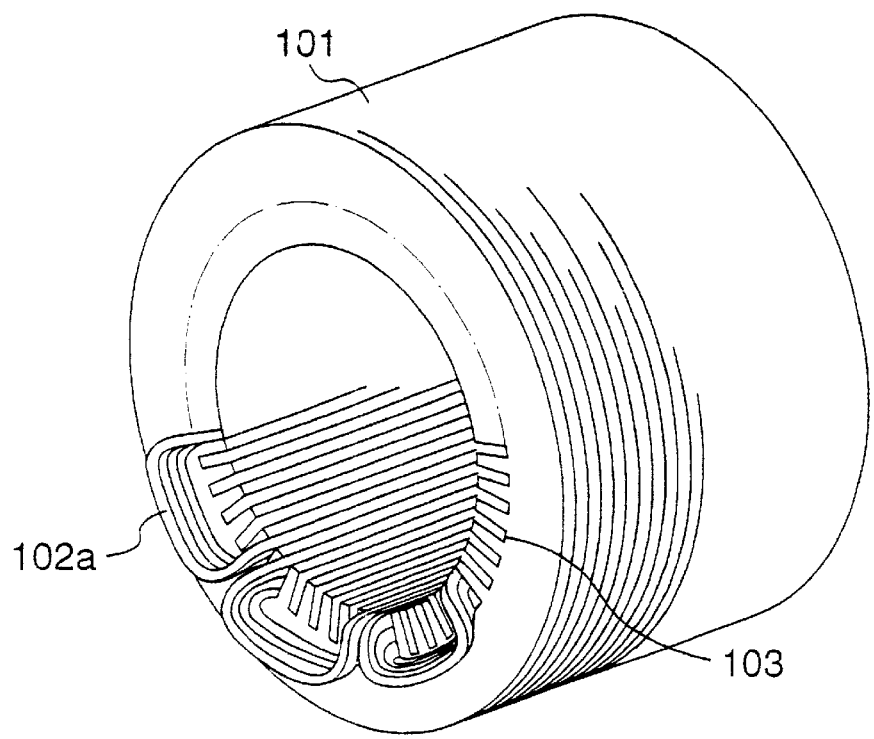
FIG. 17 Is a perspective view showing a stator in which U coils according to the present invention have been installed.
Figure 18A:
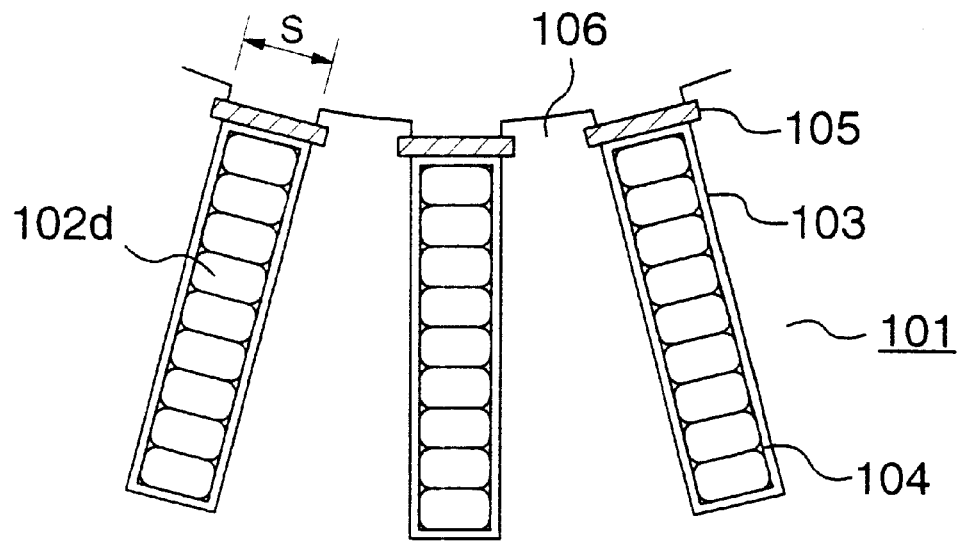
FIGS. 18A and 18B are diagrams showing the shapes of the sections of the slots of the stator in which the coils in accordance with the present invention have been inserted.
Figure 18B:
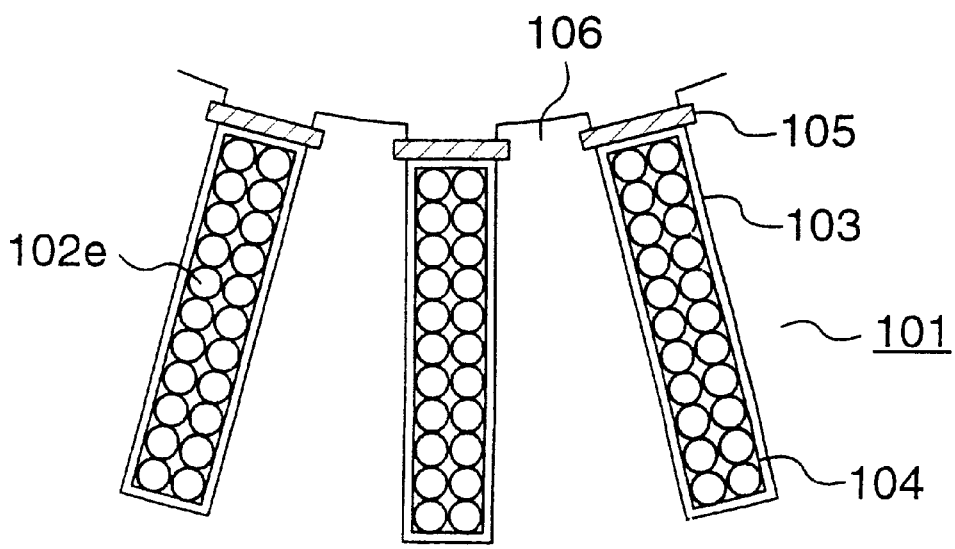

FIG. 14 shows a stator composed of three-phase concentric winding in an AC induction motor in accordance with the invention. The embodiment shown in FIG. 14 has eight each of U coils 102a, V coils 102b, and W coils 102c. FIG. 15A, FIG. 15B, and FIG. 15C respectively illustrate the section shapes of the coils at the lines A—A, B—B, and C—C shown in FIG. 14. In the section A—A shown in FIG. 14, the V coil 102b and the W coil 102c are omitted. Likewise, in the section B—B shown in FIG. 14, the W coil 102c is omitted. The portions of the coils, shown in FIG. 15, which extend beyond a core 101 are called "coil ends." FIG. 16 is a perspective view of a motor which is primarily comprised of a stator 101, a rotor 142, and a motor frame 140 which have been assembled into the motor. FIG. 17 is a perspective view showing a state where three U coils 102a have been installed; these are the first three ones to be inserted among the coils 102a, 102b, and 102c of three phases. FIG. 18A and FIG. 18B are enlarged views showing the sections of the slots of the stator in which the coils have been installed.

The stator core 101 in the drawings is formed by press-cutting silicon steel plates which are electromagnetic steel plates and stacking them in multiple layers. The stator coils 102, 102a, 102b, and 102c are formed by winding enameled wires, which have insulation coating on the outermost layers thereof, by a predetermined number of turns. Slots 103 in the drawings are formed in the core 101; in this invention, the slots are open slots wherein slot width "s" (shown in FIGS. 18A and 18B) of the coil inlet closer to the center of the core 101 is smaller than the maximum width of the slot. Further, as illustrated in FIGS. 18A and 18B, the coils 102d and 102e are installed closely in the slot 103 with high density. In this case, provided around the coils 102d and 102e is a slot insulating paper 104 composed of, for example, polyamide, polyimide, polyphenylene sulfide, or Nomex which exhibits characteristics equivalent to the insulation characteristic of the enameled wire; the insulating paper is installed together with the coils 102d and 102e to the core 101. Slot wedges 105 are inserted to prevent inserted coils 102d and 102e from coming out of the open slots 103 toward the inside diameter of the core. The slot wedges 105 use the insulating paper similar to the foregoing slot insulating paper. Use of films or sheets containing a magnetic material or magnetic plates containing a magnetic material for the slot wedges 105 is even more effective because it will restrain the changes in the magnetic flux among the slots, i.e. teeth 106.

In this invention, as shown in FIG. 14 and FIG. 15, the coils of the respective phases are inserted without interfering with already inserted coils, and the coil ends are installed with high density in the radial and axial directions of the core 101 as shown in FIG. 15. These drawings show a stator and coils of 3 phases, 48 slots, and 8 poles; the three coils 102a, 102b, and 102c are respectively called "U coils", "V coils" and "W coils". As shown in FIG. 14, the end coil portions, i.e. the contact portions, of the U coils 102a are so shaped that the slots in which the V coil 102b and the W coil 102c are inserted may be seen from the axial direction, and they are wound in nearly an arc shape along the slot for the V coil and the slot for the W coil. More specifically, inside diameter R3 of the end coil portion of the U coil 102a is made slightly larger than outside diameter R2' of the slot so that the slots in which the V coil 102b and the W coil 102c are in can be seen from the axial direction. Reference character R1 denotes the inside diameter of the core 101, and reference character R3 denotes the outside diameter of the end coil portion of the U coil 102a. Further, in the end coil portion, i.e. contact portion, of the U coil 102a, the coil ends are aligned as illustrated in FIGS. 15A, 15B, and 15C. For example, in the case of a coil composed of nine turns, the coil ends are arranged in 2 rows by 5 columns in the coil end section; the contact portion is distance dimension "x", which is equivalent to curve "r" (twice as large as the diameter of the enameled wire) of the wire, at the end surface of the core, the dimension "x" being not less than the dimension that ensures the insulation to the earth. Since the coil ends of the U coil 102a are aligned in 2 rows by 5 columns, axial dimension xa can be reduced to prevent waste or loss of the material used for the end coil portions.

As shown in FIG. 15B, the end coil portion of the V coil 102b, i.e. the contact portion of the slot, passes above the U coil 102a in the axial direction; it provides a space inside the contact portion so that the slot for the W coil 102c to be inserted next may be provided in the space. As shown in FIG. 14, the end coil portion of the V coil 102b is inclined in the radial direction toward the outside diameter from the point which is "x" away from the core end surface, and it is disposed on the U coil 102a. At this time, an axial gap Xs is secured between the axial top end of the end coil portion of the U coil 102a and the axial bottom end of the end coil portion of the V coil 102b in order to prevent interference between the two coils.

The section of the end coil portion of the V coil 102b also has the coil ends aligned in 2 rows by 5 columns as in the case of the U coil 102a; hence, axial dimension xb of the end coil portion of the V coil 102b can be reduced. Further, the radial inner end of the end coil portion of the V coil 102b is formed such that it does not extend inward beyond the inside diameter R1 of the core.

As illustrated in FIG. 15C, the end coil portion of the W coil 102c. i.e. the contact portion of the slot, is formed such that it is held in the space provided by the U coil 102a and the V coil 102b and that it does not interfere with the end coil portions of the U coil 102a and the V coil 102b; the contact portion thereof is disposed on the side closer to the inside diameter. The radial inner end of the end coil portion of the W coil 102c does not extend inward beyond the inside diameter R1 of the core.

At this time, the end coil portions of all inserted coils 102a, 102b, and 102c do not jut out toward the inside diameter of the stator 101, permitting easy installation of a rotor after assembling the stator.

To give specific figures, when an enameled wire having a 2.4 mm-diameter conductor and a polyamide-imide insulating layer is wound by 9 turns into a coil and the coil is installed. xa=15 mm, xb=6 mm, and ya=25 mm; hence, it is possible to achieve 30 mm or less of the total of x+xa+xb+xs as shown in FIG. 15C. At this time, the coils can be installed on the core 101 without interfering with the coils which have already been inserted.

Further, as illustrated in FIG. 18A, forming the sections of the coils approximately into rectangular shapes ensures further improved occupancy of slots. Unlike the coils shown in FIG. 18A, the coils may employ thin wires and wound in alignment as illustrated in FIG. 18B. Higher occupancy can be achieved by forming the sections of the coils shown in FIG. 18B into rectangular shapes. The forming method will be discussed later.

Figure 20:
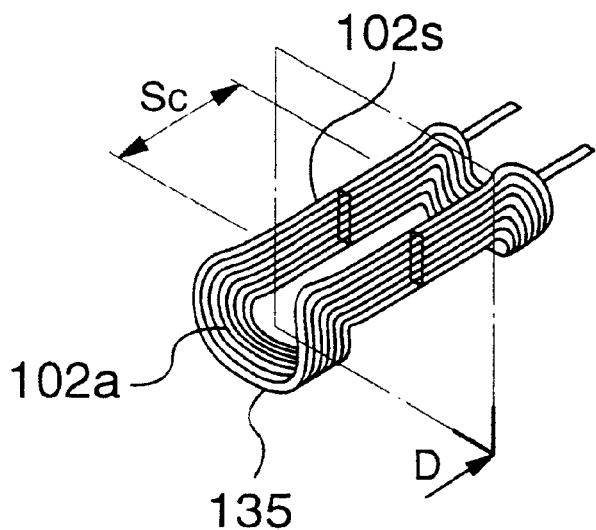
FIG. 20 is a perspective view showing the shape of the U coil which has been formed by the aligned winding in accordance with the present invention.
Figure 21:
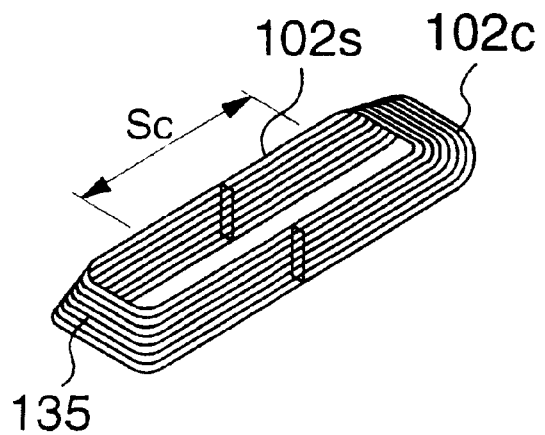
FIG. 21 is a perspective view showing the shape of the W coil which has been formed by the aligned winding in accordance with the present invention.
Figure 22:
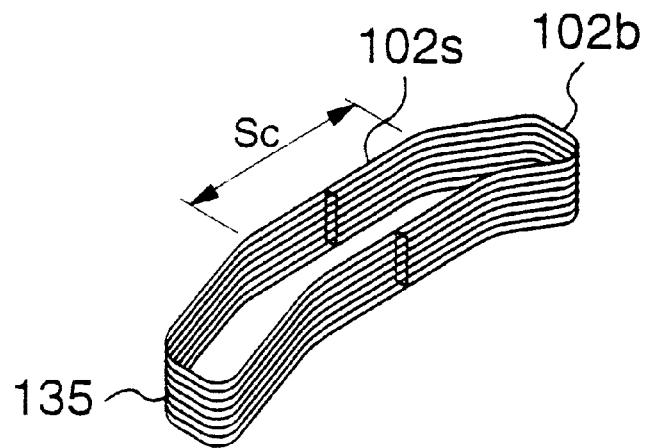
FIG. 22 is a perspective view showing the shape of a V coil which has been formed by the aligned winding in accordance with the present invention.

FIG. 19A through FIG. 19D illustrate how to wind the U coils 102a and the W coils 102c. FIG. 20 is a perspective view giving a general view of the U coil 102a. A portion indicated by Sc of the coil shown in FIG. 20 is inserted in a slot of the core 101 (hereinafter referred to as "slot coil"). FIG. 21 is a perspective view giving a general view of the N coil 102c. A portion indicated by Sc of the coil in FIG. 21 is inserted in a slot of the core 101 (hereinafter referred to as "slot coil"). FIG. 22 is a perspective view giving a general view of the V coil 102b. A portion indicated by Sc of the coil in FIG. 22 is inserted in a slot of the core 101 (hereinafter referred to as "slot coil").

Figure 23A:
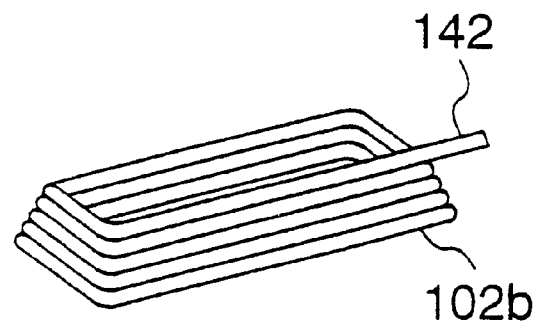
FIGS. 23A and 23B are perspective views illustrating how the V coil is formed by the aligned winding in accordance with the present invention.
Figure 23B:
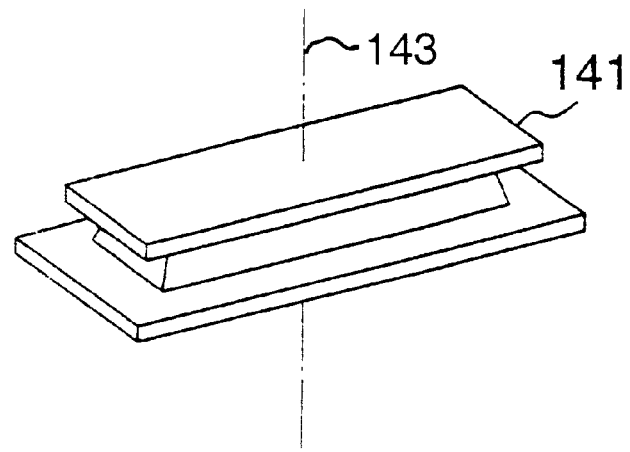
Figure 24:
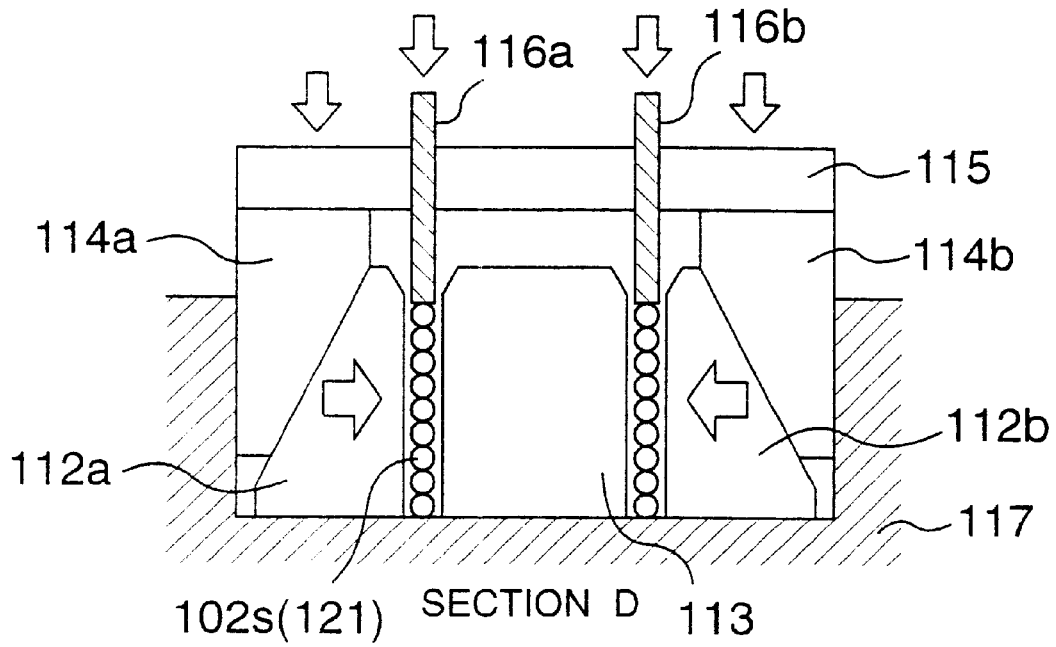
FIG. 24 is a sectional view showing an embodiment of the slot coil forming mold for forming the slot coil in accordance with the present invention.
Figure 25:
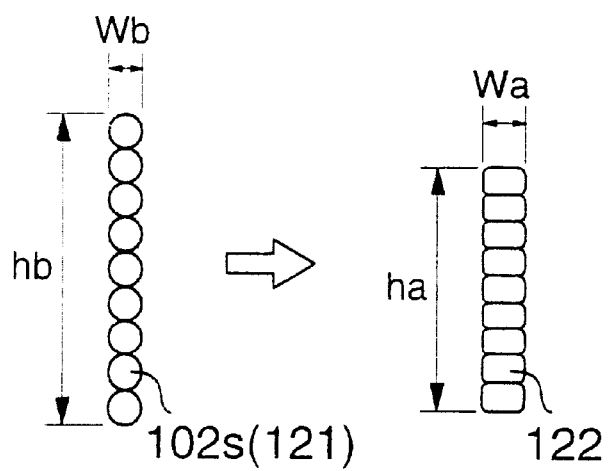
FIG. 25 is a diagram illustrative of the shapes of the sections of the slot coil before and after forming it by using the slot coil forming mold shown in FIG. 24.
Figure 26:
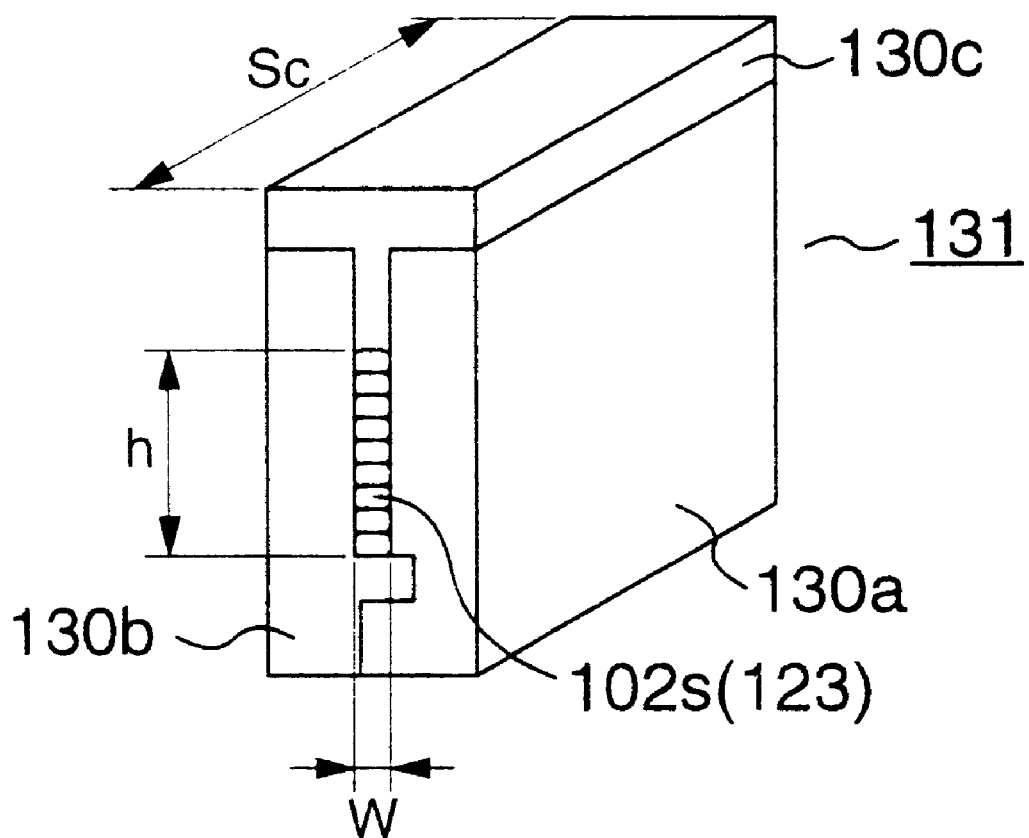
FIG. 26 is a perspective view showing an embodiment of an aligning jig for maintaining the alignment of the slot coil in accordance with the present invention.
Figure 27A:
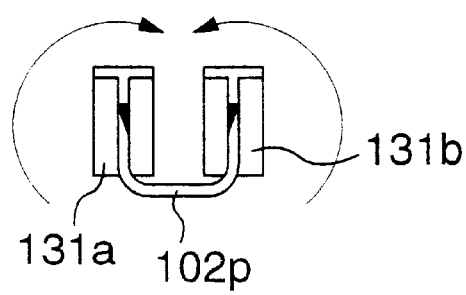
FIGS. 27A, 27B, 27C, and 27D are diagrams illustrating an embodiment of the method of deforming the contact portion of each of paired coil sides (slot coil) inserted in paired slots approximately to the angle at which it is spanned over the paired slots in the coil in accordance with the present invention.
Figure 27B:
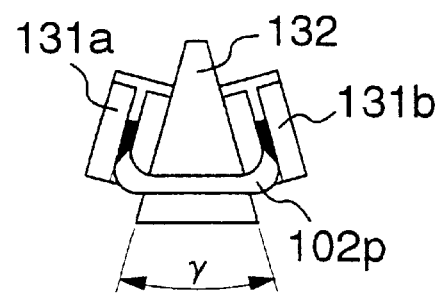
Figure 28A:
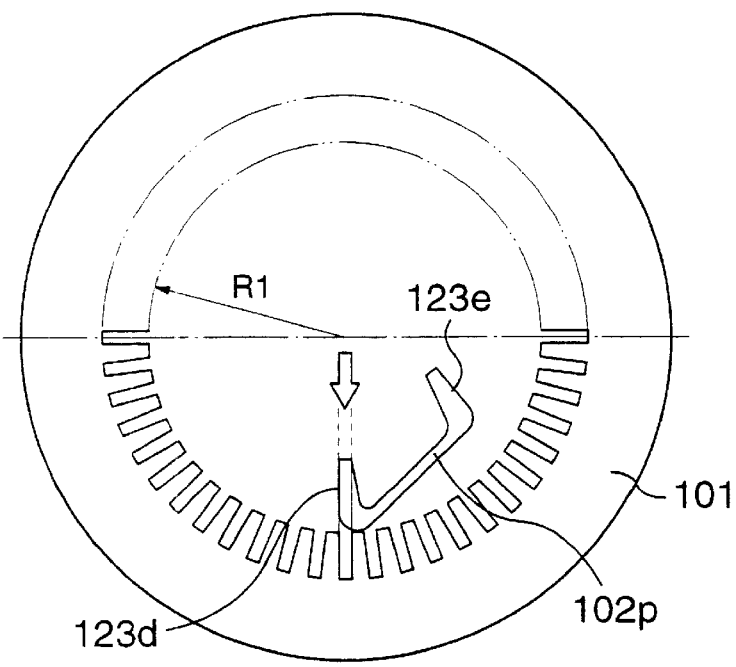
FIGS. 28A, 28B, and 28C are diagrams for illustrating an embodiment of the method of installing a coil on a core in accordance with the present invention.

FIGS. 23A and 23B show how to wind the V coil 102b. FIG. 24 is a sectional view showing a forming mold in the method for forming a slot coil 102s (121) with a high density. FIG. 25 illustrates the difference in dimension between a section of the coil before forming 121 and a section of the coil after forming 122 when forming the coil shown in FIG. 24. FIG. 26 shows a jig for securing a slot coil 102s (123) with a high density in alignment. FIGS. 27A, 27B. 27C, and 27D show the jig and the method for deforming a coil, especially a coil end, to shape a coil end. FIGS. 28A. 28B, and 28C show the procedure for installing the deformed coil in the slots of the core 101.

A former 110 which has two rotating axes as shown in FIG. 19 is used to form the U coil 102a and the W coil 102c in accordance with the present invention and to shape the coil ends. The end coil portion, i.e. the contact portion, of the U coil 102a is formed radially between R2 and R3 and formed axially between x and x+xa from the end surface of the core as illustrated in FIG. 15A. The end coil portion, i.e. the contact portion, of the W coil 102c is formed radially between R4 and R5 and formed axially between xc, which is larger than x, and xc+xa from the end surface of the core as illustrated in FIG. 15C. Hence, it is required that the former for the U coil 102a has a different dimension from the former for the W coil 102c. The foregoing former 110 is equipped with a guide 111 for keeping the slot coil portion in alignment.

Figure 19A:
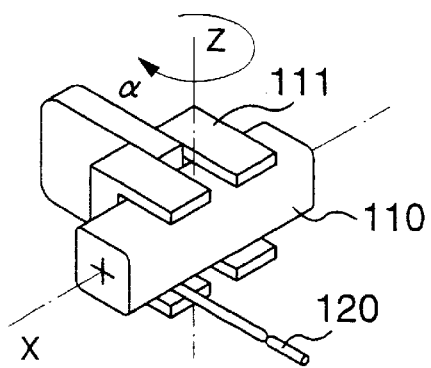
FIGS. 19A, 19B. 19C, and 19D are perspective views illustrating how U coils and W coils are formed by the aligned winding in accordance with the present invention.
Figure 19B:
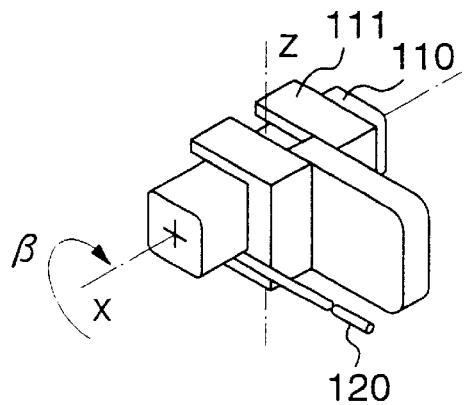
Figure 19C:
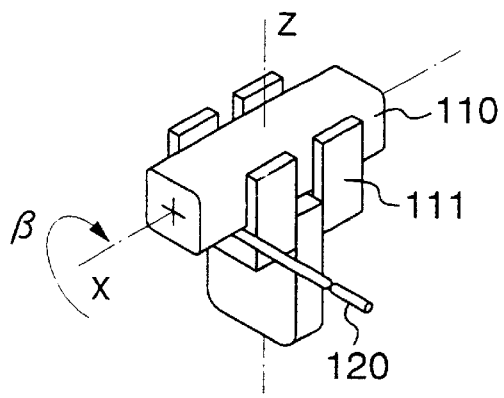
Figure 19D:
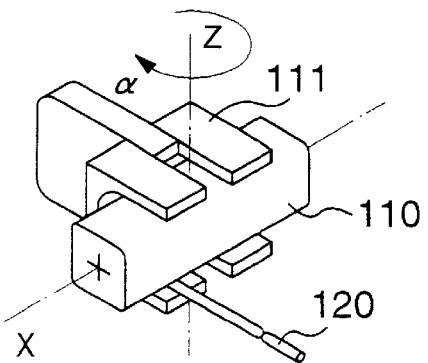

To form the U coil 102a and the W coil 102c into the predetermined coil shapes, the winding start point of a coil enameled wire 120 is first fixed on the former 110 as illustrated in FIG. 19A. Then, the former is turned 180 degrees about Z-axis, i.e. in α direction of rotation, as illustrated in FIG. 19B. At this time, the enameled wire 120 is guided in a direction perpendicular to Z-axis. Then, the former is turned 90 degrees about X-axis. I.e. in β direction of rotation as illustrated in FIG. 19C. At this point, in order to align the wound coil end portion, the enameled wire is shaped along the former 110 In the direction of the axial center. Then, the former is further turned 90 degrees about the X-axis, i.e. in the β direction of rotation as illustrated in FIG. 19D. This completes half a turn. The foregoing coil end may be shaped at this point. The procedure of the steps shown FIG. 19A through FIG. 19D is repeated to rotate the former by a predetermined number of turns to complete the coil. It is possible to form the coil end into two or more columns by adjusting the angle β about the X-axis every half a turn thereby controlling the track of the wire.

FIG. 20 shows the U coil 102a wound as described above; and FIG. 21 shows the W coil 102c wound as described above.

FIG. 23B shows a former 141 for winding the V coil 102b. An enameled wire 142 is wound by rotating the former 141 about an axis 143 to form the V coil 102b shown in FIG. 23A. However, the shape of the V coil 102b inserted in the slots of the core 101 is actually as shown in FIG. 22 and FIGS. 15B and 15C; therefore, it is necessary to shape the end coil portion, i.e. the contact portion, thereof.

It is also necessary to form the slot coil Sc to be inserted in the slot 103 into a rectangular shape in order to accomplish a higher slot occupancy. FIG. 24 shows the method for forming the slot coil Sc into the rectangular shape and FIG. 25 shows the sectional shape of the coil. The Sc portion sides shown in FIG. 20, FIG. 21, and FIG. 22 are set on the forming mold shown in FIG. 24 and formed to have the rectangular section. The forming mold has a structure in which a block 113 is disposed at the center of the groove of a base 117, and side guides 112a and 112b for applying pressure to the coil sideways are disposed on both sides of the block so as to apply pressure to both sides substantially at the same time by a side base 115 via side punches 114a and 114b. Pressure is vertically applied to the coil by punches 116a and 116b which have a punching width which is not more than the width of a formed coil. First, the gap between the block 113 and the side punches 112 is set to the diameter of the wire or larger, and the coil is placed on the forming mold. Pressure is applied to the punches 116 to perform longitudinal forming. For this purpose, stoppers are provided to stop the side punches 114a and 114b after they have moved a predetermined distance or to stop them at the same position. If no stopper is provided, pressure may be applied laterally to an extent that does not disturb the alignment of the coil. After completion of the longitudinal forming by the punches 116a and 116b, the lateral forming is carried out by applying pressure to the side punches 114a and 114b via the side base 115. For this purpose, the punches 116a and 116b should be provided with stoppers to stop them at a predetermined distance or a pressure which is weaker than the lateral forming reaction force should be applied. The coil section indicated by 121 is formed into a nearly square shape 122 as shown in FIG. 25 by the aforesaid forming process composed of the two longitudinal and lateral forming steps. For example, when a coil composed of nine turns of an enameled wire having a 2.4 mm conductor diameter and a polyamide-imide insulating layer is formed, the section of the coil having hb=23 mm and wb=2.6 mm can be formed into the approximately square section having ha=17 mm and wb=2.6 mm as indicated by 122. In this case, the radius "r" of the corner of the wire section after forming measures 0.2 to 0.3 mm. This enables the section 122 of the formed coil to satisfy a slot occupancy of 90% or more. Further, the rectangular forming of the coil section according to the forming method described above is implemented in two steps, namely, the longitudinal and lateral forming steps; therefore, a higher degree of freedom is permitted for forming the coil section. This leads to a higher degree of freedom in designing the slot opening "s", i.e. the width of the inlet of a slot, which is an important dimension in designing a motor.

Thus, forming the slot coil portions Sc to be inserted in the slots 103 into the square shape and making them into one piece by bonding or the like makes it possible to prevent aligned coils from being disturbed, achieve a higher slot occupancy and higher density of coil ends, and permit allowance in magnetic flux when designing a motor. In addition, the fewer coil ends result in a reduced peripheral dimension of the coil, so that copper loss can be reduced. This enables higher motor efficiency and a smaller, lighter motor.

Figure 27C:
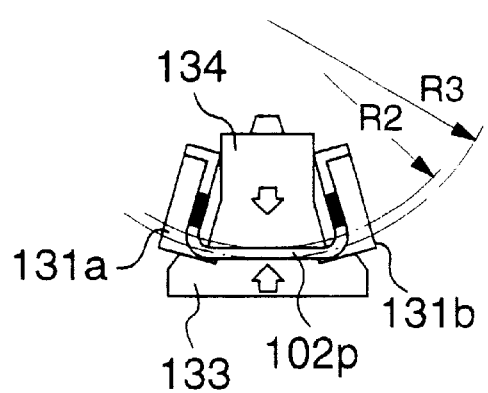
Figure 27D:
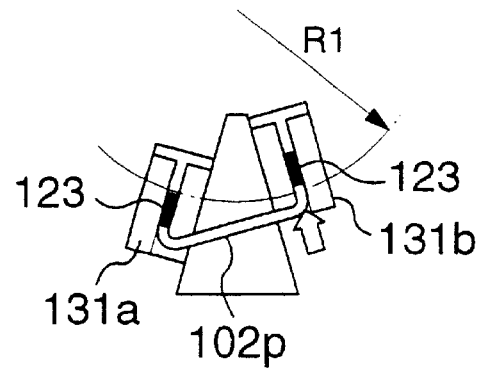

The method of forming the coil into a shape to install it to the core 101 will now be described in conjunction with FIG. 26 through FIG. 28. The slot coil portions Sc are held and fixed one at a time by a shaping jig 131 constructed by clamping jig members (clamping components) 130a through 130c shown in FIG. 26. The shaping jig 131 is composed of three or more clamping jig members (clamping components) 130a, 130b, and 130c so that it is able to retain the section of a coil laterally and longitudinally by screws or a press in order to hold slot coil sections 123 (gap "W" and height "h") in alignment with high density. FIG. 27A shows both sides of the slot coil clamped by aligning jigs 131a and 131b shown in FIG. 26. Then, to match the angles of the two sides of the slot coil to a slot crossing angle γ, a moment is applied to an end coil portion 102p to deform it between aligning jigs 131a and 131b as illustrated in FIG. 27B, and the aligning jigs 131a and 131b are placed on a deforming base 132. The angle γ of the deforming base 132 is preferably the slot crossing angle or less, considering the springback of after the deformation. The slot crossing angle is, for instance, 37.5 degrees for a three-phase, 8-pole, 48-slot stator. As illustrated in FIG. 27B, the aligning jigs 131a and 131b which are clamping the coil to form the coil into the shape for inserting in slots are secured on the deforming base 132. Then, an outer guide 133 and an inner guide 134 apply pressure to the coil end to correct the shape of the end of the wound coil as illustrated in FIG. 27C. At this time, a block capable of applying pressure also in the axial direction of the core may be provided to apply pressure. FIG. 27 illustrates how the U coil 102a is deformed; outer dimension R3 and inner dimension R2 of the end coil portion 102p shown in FIG. 27C correspond to the dimensions R3 and R2, respectively, shown in FIG. 15A, and they show the dimensions for the radius or larger which allow the slots in which the V coil 102b and the W coil 102c are inserted are exposed, and they show the values applied when the coil ends are aligned with high density. Thus, the deformed coil end shown in FIG. 27C provides the coil end shape equivalent to the one after insertion. In the following step, with the aligning jig 131a fixed on the deforming base 132, the other aligning jig 131b is moved along the deforming base 132 toward the center of the core as illustrated in FIG. 27D. At this time, the coil end is deformed until the outside diameter of the moved aligning jig 131b becomes smaller than R1 which is the radius of the inside diameter of the core in a coil section 123. In this case also, the deformation is performed, taking the springback after deformation into account, such that the intended shape will be maintained after completion of the deforming process.

Figure 28B:
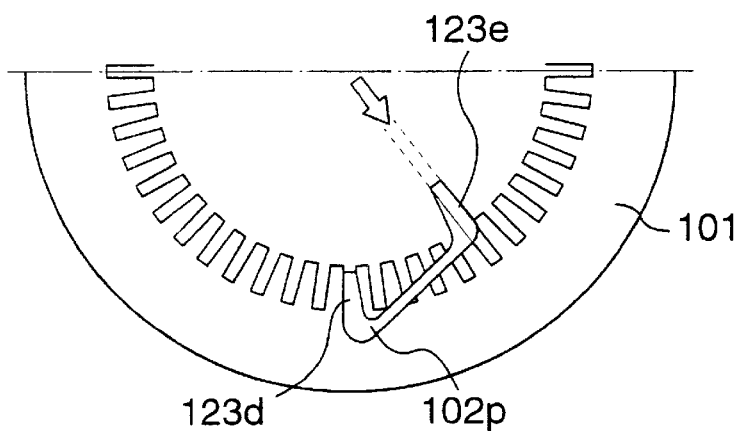
Figure 28C:
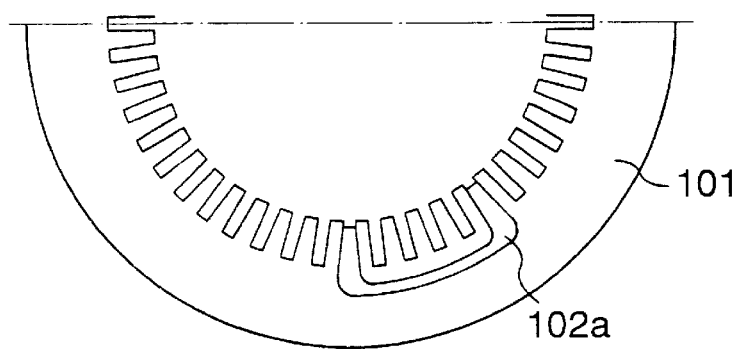

Referring now to FIG. 28, the operation for inserting or installing the deformed coils in or onto the core will now be described. FIG. 28 shows a case where the U coil 102*a* is used as the case previously described. In FIG. 28A, one side 123*d* of the slot coil which has been deformed in FIG. 27 is disposed in parallel to the groove of a slot. At this time, the other deformed slot coil side 123*e* is positioned inside the inner periphery of the core 101. In FIG. 28A, the coil is positioned in relation to the slot, then it is pressurized outward in the radial direction of the core to insert it in the slot. The shape of the coil after the insertion is shown in FIG. 28B. At this point, because of the deformation of the coil which has been described with reference to FIG. 27, the slot coil side 123*e* which is still uninserted is positioned such that it is parallel to the groove of the slot in which it is to be inserted and that it is on the inner periphery side of the core. Then, in the same manner as that for the slot coil side 123*d* shown in FIG. 28A, the slot coil side 123*e* is positioned in relation to the slot in which it is to be inserted, then the slot coil side 123*e* is pressurized outward in the radial direction of the core to insert it in the slot. Thus, the insertion of the slot coil side 123*e* is completed as shown in FIG. 28C. Preferably, a guide is provided to position the slot coil side 123*e* with respect to the slots so as to insert it in parallel when inserting the slot coil side 123*e* in the slots of the core. After the other slot coil side 123*d* shown in FIGS. 28A and 28B has been inserted, the slot wedge 105 shown in FIG. 18 may be inserted to secure the slot coil, or the slot coil side may be secured by fixing the jig for applying pressure for the Insertion so as to prevent the inserted slot coil side from being shifted to the inner periphery of the core. Unlike the first insertion, the insertion of the slot coil side 123*e* after the step illustrated in FIG. 28B involves the deformation of the coil end 102*p*. This increases the insertion resistance of the slot and coil; hence, a wedge-shaped, force-doubling mechanism or a mechanism which provides inserting force by a rack pinion, cam, etc. should be used. The insertion resistance depends on the number of turns making up the coil, the sectional area of the coil end which corresponds to the conductor diameter, and the material used for the wire composed a conductor and an insulating layer. The insertion resistance also depends on the frictional resistance between the slot insulating paper around the coil and a core.

The description has been given to the case of the U coil 102*a*; however, the same deforming and inserting procedures can be applied to the V coils 102*b* and the W coils 102*c* which have different shapes.

Preferably, as the aforesaid enameled wire, a self-fusing conductor which has an epoxy- or nylon-based fusing layer as the outermost layer thereof is employed and it is heated upon completion of the deformation process to bind the aligned coil wires. The wire may be heated electrically by utilizing the resistance of the coil or by passing it through a heating furnace. The coil wires may be bonded together by using a film or sheet for the slot insulating paper or by using a heat-resistant adhesive tape.

According to the embodiments described above, a stator featuring a higher slot occupancy and a higher density of disposed coil ends can be achieved, and the coils can be inserted in a core without interference with other phases or already inserted coils. Moreover, the deformation of coil ends in the axial direction is minimized, so that the shapes of inserted coils are closer to the designed as-inserted shapes when the insertion of coils is completed. This obviates the need for the finish shaping of the coil ends after inserting coils in assembling a stator.

The present invention makes it possible to accomplish a higher slot occupancy of stator coils and coils ends to be arranged in alignment with a higher density with consequent lower winding resistance. This permits higher efficiency of a motor and reduced size and weight of the motor. The motor with higher efficiency and reduced size and weight can be ideally used as the driving motor for an electric vehicle.

In addition, according to the present invention, the shape of a coil is finished before it is installed on a stator core so as to ensure stable, even coil shapes, thus eliminating the need for the finish shaping process of coil ends. This leads to higher efficiency of work and also to reduced chances of damage to the insulation coating of inserted coils, permitting stable quality.

What is claimed is:

1. A motor having a lap winding structure in which inserts of two different coils are installed side by side in one slot of a stator in a circumferential direction of the stator; and wherein said stator has semi-closed type slots, each slot being formed with a single protuberance at its inlet end extending from one side towards a center line thereof, the single protuberance of at least one slot being oriented in a different direction from a single protuberance of at least one other slot.

2. A motor according to claim 1, wherein said coil is shaped to be approximately asymmetric with respect to the centerline of a coil end.

3. A motor having coils of a plurality of phases generating a rotating magnetic field at a stator, wherein an inner side of a contact portion of a coil of a phase among the coils of the plurality of phases, the contact portion being located at the outermost position in a radial direction, is positioned outside slots in which the coils of other phases are inserted, thereby preventing the contact portion from interfering with end portions of coils of other phases.

4. A motor according to claim 3, wherein the motor has a stator composed of three-phase concentric winding; a coil slot occupancy of 80% or more; ends of the coils of respective phases have different shapes; and the contact portions of the coils of the respective phases are arranged in alignment.

5. A manufacturing method for a stator which includes:

a winding step for forming a coil by aligned winding;

a coil forming step for compression-forming paired coil sides, which are inserted in paired slots, in a coil formed in the winding step, into rectangular shapes to deform a contact portion approximately to an angle at which it is spanned over the paired slots; and an installing step for positioning the coil, which has been formed in the coil forming step, on the inner periphery of a core and for installing the coil by inserting the paired coil sides of the coil in corresponding slots in sequence.

6. A manufacturing method for a stator which includes:

a winding step for forming a U coil by aligned winding, for forming a V coil by aligned winding, and for forming a W coil by aligned winding;

a coil forming step for compression-forming paired coil sides, which are to be inserted in paired slots, in each of the U coil, the V coil., and the W coil formed in the winding step, into rectangular shapes and for deforming the contact portions thereof approximately to angles at which they are spanned over the paired slots; and an installing step for positioning each of the U coil, the V coil, and the W coil, which have been formed in the coil forming step, on the inner periphery of a core and for installing the coils by inserting the paired coil sides of each coil in corresponding slots in sequence.

7. A motor according to claim 3, wherein the motor has a stator composed of three-phase concentric winding;

a coil slot occupancy of 80% or more;

ends of the coils of respective phases have different shapes; and the contact portions of the coils of the respective phases are arranged in alignment.

* * * * *